(12) United States Patent
Liu et al.

(10) Patent No.: US 9,078,173 B2
(45) Date of Patent: Jul. 7, 2015

(54) METHOD FOR HANDOVER FROM CIRCUIT SWITCHED DOMAIN TO PACKET SWITCHED DOMAIN, DEVICE, AND COMMUNICATIONS SYSTEM

(71) Applicant: Huawei Technologies Co., Ltd., Shenzhen (CN)

(72) Inventors: Hai Liu, Shenzhen (CN); Xiaobo Wu, Shenzhen (CN); Xiaoying Xu, Shenzhen (CN); Wenruo Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 13/664,302

(22) Filed: Oct. 30, 2012

(65) Prior Publication Data

US 2013/0051368 A1 Feb. 28, 2013

Related U.S. Application Data

(63) Continuation of application No. PCT/CN2011/073591, filed on May 3, 2011.

(30) Foreign Application Priority Data

Apr. 30, 2010 (CN) .......................... 2010 1 0168695

(51) Int. Cl.
*H04W 4/00* (2009.01)
*H04W 36/00* (2009.01)

(52) U.S. Cl.
CPC ................................ *H04W 36/0022* (2013.01)

(58) Field of Classification Search
USPC ........................... 370/328, 329, 331, 338, 401
See application file for complete search history.

(56) References Cited

U.S. PATENT DOCUMENTS

| 6,721,565 | B1 * | 4/2004 | Ejzak et al. ................... 455/436 |
| 7,002,935 | B2 * | 2/2006 | Kriaras et al. ................ 370/328 |
| 2008/0026752 | A1 | 1/2008 | Flore et al. |

(Continued)

FOREIGN PATENT DOCUMENTS

| CN | 101291537 A | 10/2008 |
| CN | 101370261 A | 2/2009 |

(Continued)

OTHER PUBLICATIONS

Notice of Reason for Rejection received in Japanese Application No. 2013-506484 mailed Nov. 5, 2013, 5 pages.

(Continued)

*Primary Examiner* — Ricky Ngo
*Assistant Examiner* — Christine Ng
(74) *Attorney, Agent, or Firm* — Slater & Matsil, L.L.P.

(57) ABSTRACT

Embodiments of the present invention disclose a method for a handover from a circuit switched domain to a packet switched domain, a device, and a communications system. One of CS to PS handover methods includes receiving, by a target mobility management entity, a CS to PS handover request message that corresponds to a first UE and is from an MSC; triggering setup of a dedicated VoIP bearer that corresponds to the first UE and is between an SGW and an MGW; sending a handover request message to a target access network to instruct the target access network to prepare a handover resource for the first UE; and sending a CS to PS handover response message corresponding to the first UE to the MSC.

20 Claims, 18 Drawing Sheets

(56) References Cited

U.S. PATENT DOCUMENTS

| | | | |
|---|---|---|---|
| 2008/0159223 A1 | 7/2008 | Palat et al. | |
| 2008/0267128 A1 | 10/2008 | Bennett et al. | |
| 2009/0086674 A1 | 4/2009 | Ejzak | |
| 2010/0220862 A1* | 9/2010 | Geary et al. | 380/272 |
| 2011/0026463 A1* | 2/2011 | Lair | 370/328 |
| 2011/0110326 A1 | 5/2011 | Rexhepi et al. | |
| 2011/0158121 A1* | 6/2011 | Casati et al. | 370/252 |
| 2011/0249652 A1* | 10/2011 | Keller et al. | 370/331 |

FOREIGN PATENT DOCUMENTS

| | | | |
|---|---|---|---|
| CN | 101374356 A | 2/2009 | |
| CN | 101480083 A | 7/2009 | |
| CN | 101569225 A | 10/2009 | |
| CN | 101574007 A | 11/2009 | |
| EP | 2 159 971 A1 | 3/2010 | |
| JP | 2010068233 A | 3/2010 | |
| WO | WO 2007/144027 A1 | 12/2007 | |
| WO | 2008081310 A1 | 7/2008 | |
| WO | WO 2008/087519 A1 | 7/2008 | |
| WO | WO 2008/117966 A1 | 10/2008 | |
| WO | WO 2009/092260 A1 | 7/2009 | |
| WO | WO 2009/143781 A1 | 12/2009 | |

OTHER PUBLICATIONS $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401 V9.4.0, Mar. 2010, 258 pages.

China Mobile, Huawei, "Update to eSRVCC alternative 6," 3GPP TSG SA WG2 Meeting #77, TD S2-100369, Shenzhen, China, Jan. 18-22, 2009, 9 pages.

International Search Report received in International Application No. PCT/CN2001/073591, Applicant: Huawei Technologies Co., Ltd., et al., received Aug. 11, 2011, 4 pages.

Written Opinion of the International Searching Authority received in International Application No. PCT/CN2001/073591, Applicant: Huawei Technologies Co., Ltd., et al., received Aug. 11, 2011, 4 pages.

Extended European Search Report received in Application No. 11774427.6-2414; Applicant: Huawei Technologies Co., Ltd., mailed Jan. 28, 2013, 6 pages.

First Office Action of Chinese Application No. 201010168695.6 mailed Apr. 8, 2013, 11 pages. (Partial Translation).

* cited by examiner

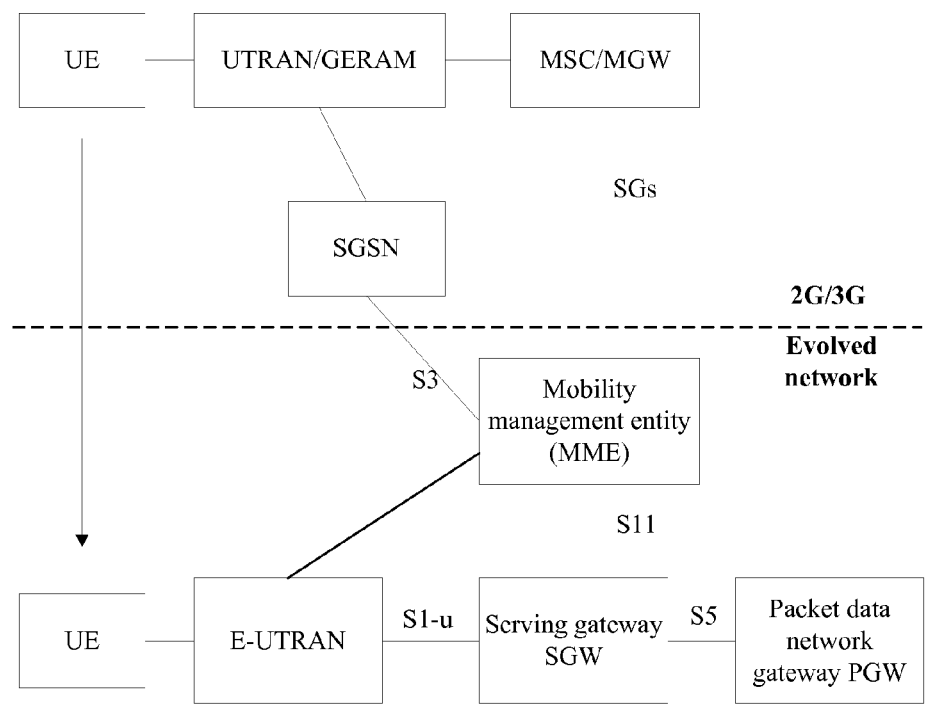
FIG. 1-a

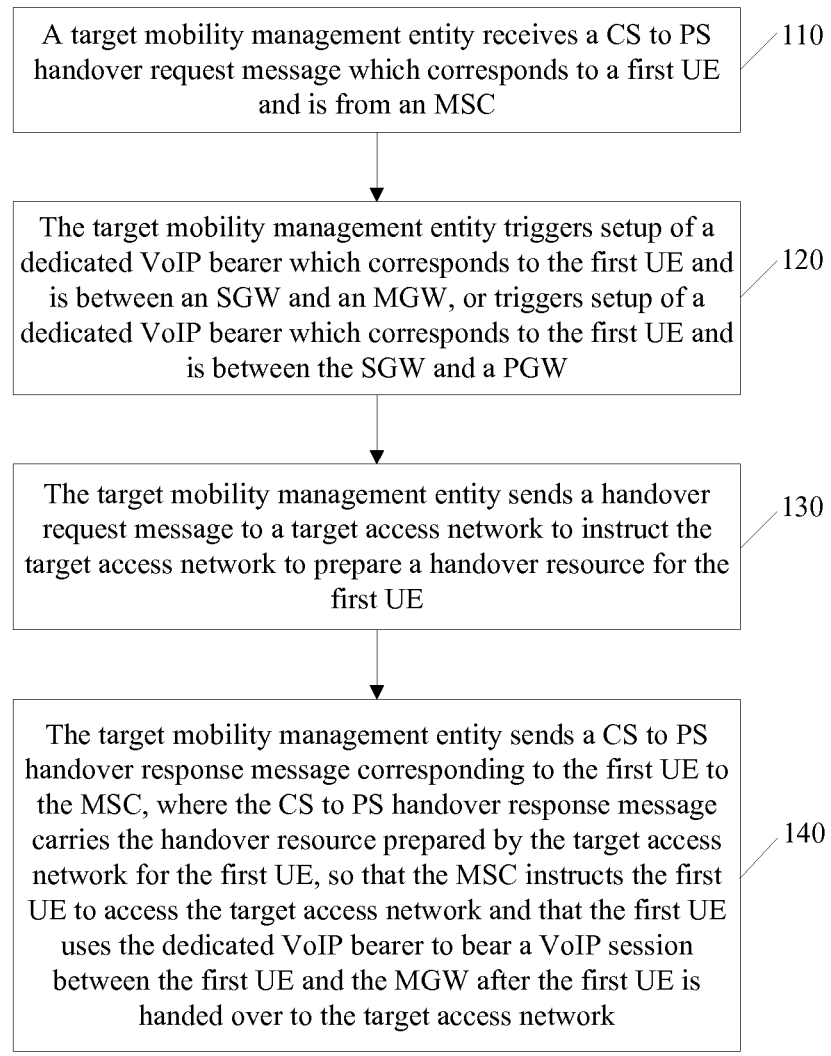
FIG. 1-b

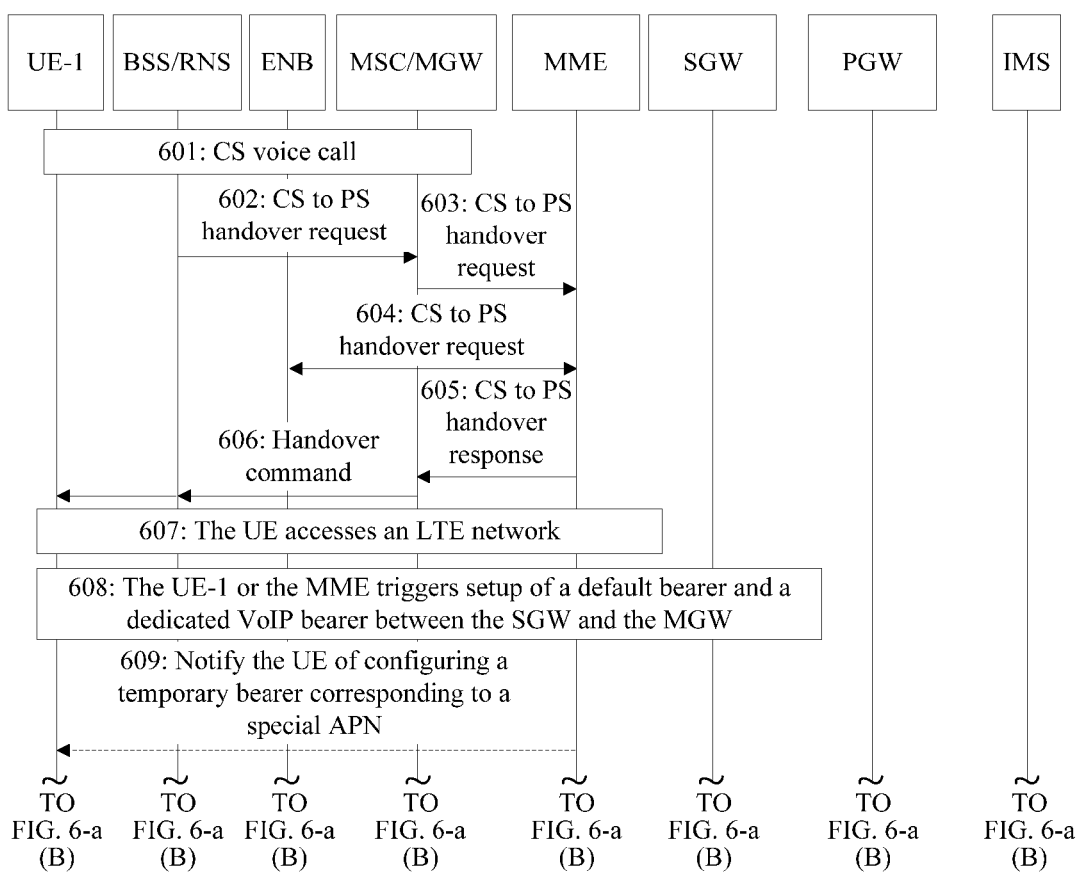
FIG. 6-a (A)

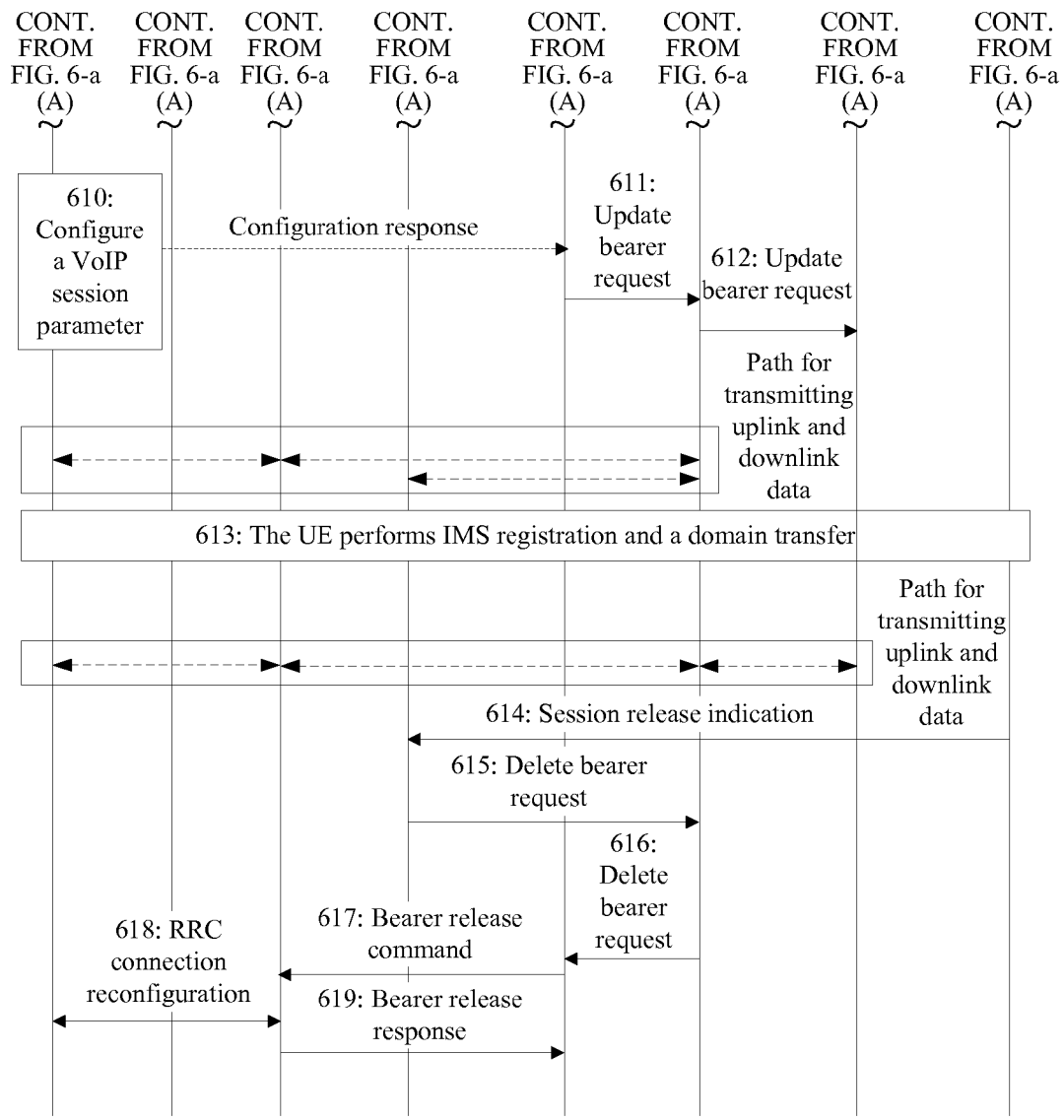
FIG. 6-a (B)

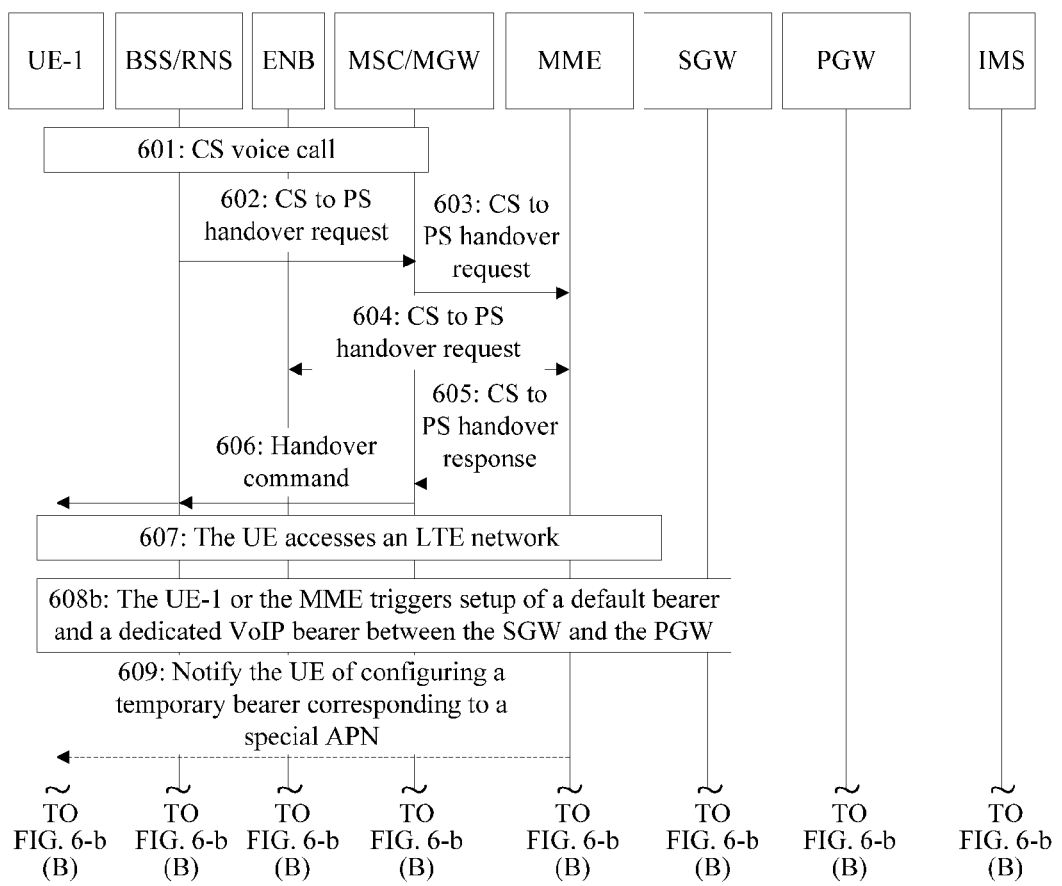
FIG. 6-b (A)

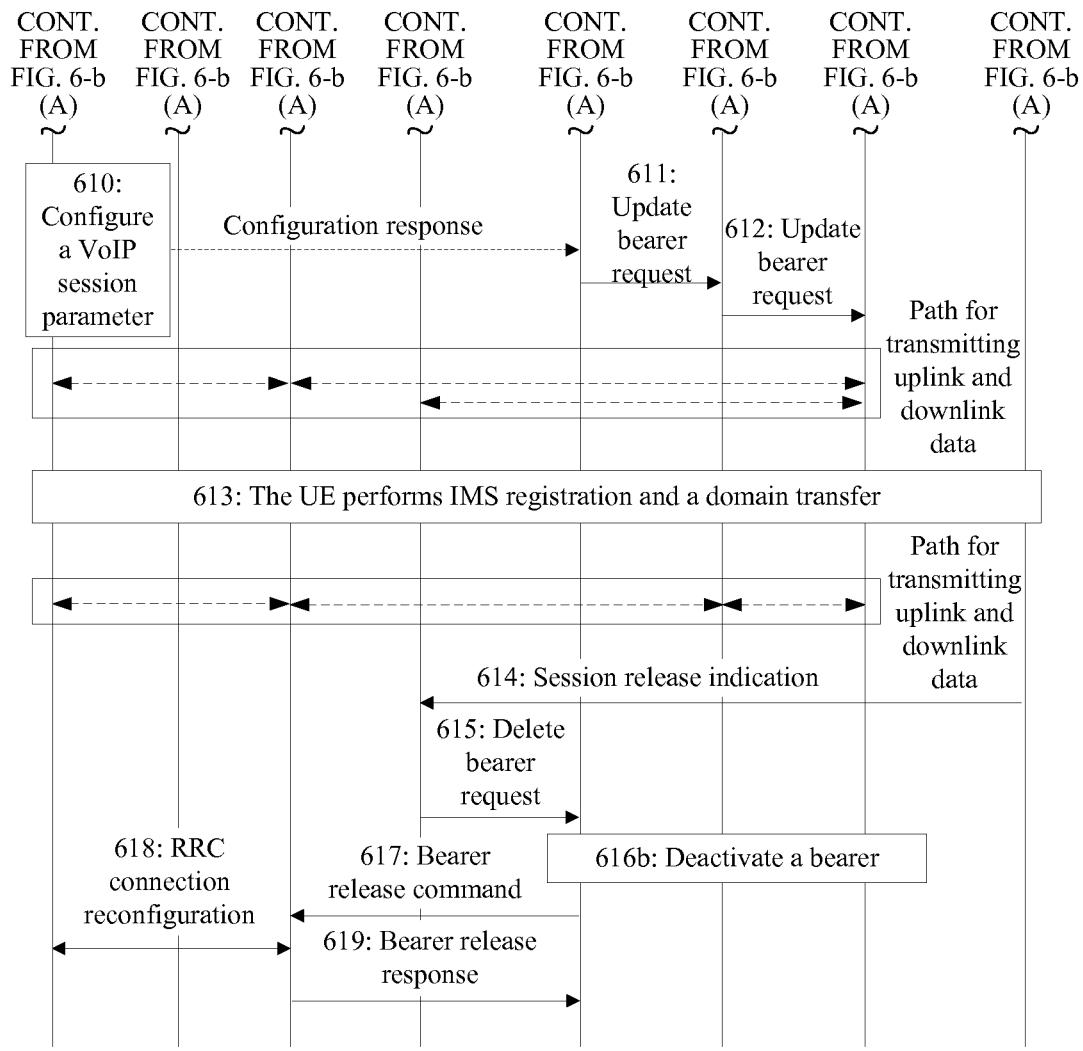
FIG. 6-b (B)

US 9,078,173 B2

METHOD FOR HANDOVER FROM CIRCUIT SWITCHED DOMAIN TO PACKET SWITCHED DOMAIN, DEVICE, AND COMMUNICATIONS SYSTEM

CROSS-REFERENCE TO RELATED APPLICATIONS

This application is a continuation of International Application No. PCT/CN2011/073591, filed on May 3, 2011, which claims priority to Chinese Patent Application No. 201010168695.6, filed on Apr. 30, 2010, both of which are hereby incorporated by reference in their entireties.

TECHNICAL FIELD

The present invention relates to the field of communications technologies, and in particular, to a method for a handover from a circuit switched domain to a packet switched domain, a device, and a communications system.

BACKGROUND

At present, networks based on a $2^{nd}$ generation global mobile communications technology or a $3^{rd}$ generation global mobile communications technology (2G/3G, $2^{nd}$ Generation/$3^{rd}$ Generation) are widely deployed in many areas, and may be regarded as full coverage to a certain extent.

Based on requirements of communications development, the Third Generation Partnership Project standardization organization launches new generation evolved network architecture, where a core network is a system architecture evolution (SAE, System Architecture Evolution) network, and an access network is an evolved universal mobile telecommunications system terrestrial radio access network (E-UTRAN) of a long term evolution (LTE, Long Term Evolution) network. A new generation evolved network has covered some metropolitan areas and traffic hotspots.

For ease of description, networks providing only PS domains, such as SAE/LTE, are referred to as pure PS domain networks. For different network bearer mechanisms, mobile communications services may be categorized into:

a service borne by a circuit switched (CS, Circuit Switching) domain, such as a voice telephone service, a short message service, and a supplementary service; and a service borne by a packet switched (PS, Packet Switching) domain, including a data service and a session service, where the session service includes a voice over Internet protocol (VoIP, Voice over Internet Protocol) service.

In actual applications, a voice service may be borne by the CS domain, and may also be borne by the PS domain. Depending on different network coverage scenarios, in a communications process, a problem that a user needs to be handed over from a 2G/3G network to an LTE network may frequently occur. Therefore, how to maintain voice continuity in a network handover process is a technical problem that needs to be researched and solved.

SUMMARY OF THE INVENTION

Embodiments of the present invention provide a method for a handover from a circuit switched domain to a packet switched domain, a device, and a communications system, which help to maintain voice continuity when a UE is handed over from the CS domain to the PS domain.

According to a first aspect of the present invention, a method for a handover from a circuit switched domain to a packet switched domain is provided and includes:

receiving, by a target mobility management entity, a circuit switched domain CS to packet switched domain PS handover request message which corresponds to a first user equipment UE and is from a mobile switching center MSC;

triggering setup of a dedicated voice over Internet protocol VoIP bearer which corresponds to the first UE and is between a serving gateway SGW and a media gateway MGW, or, triggering setup of a dedicated VoIP bearer which corresponds to the first UE and is between the SGW and a packet data network gateway PGW;

sending a handover request message to a target access network to instruct the target access network to prepare a handover resource for the first UE; and sending a CS to PS handover response message corresponding to the first UE to the MSC, where the CS to PS handover response message carries the handover resource prepared by the target access network for the first UE, so that the first UE uses the dedicated VoIP bearer to bear a VoIP session between the first UE and the MGW after the first UE is handed over to the target access network.

According to a second aspect of the present invention, a method for a handover from a circuit switched domain to a packet switched domain is provided and includes:

receiving, by a target mobility management entity, a CS to PS handover request message which corresponds to a first UE and is from an MSC, and a PS handover request message which corresponds to the first UE and is from an SGSN;

sending a handover request message to a target access network to instruct the target access network to prepare, for the first UE, a handover resource corresponding to the PS handover request message from the SGSN;

sending a CS to PS handover response message corresponding to the first UE to the MSC, and sending a PS handover response message corresponding to the first UE to the SGSN, where the CS to PS handover response message carries the handover resource prepared by the target access network for the first UE; and after a handover of the first UE is complete, triggering setup of a dedicated voice over Internet protocol VoIP bearer which corresponds to the first UE and is between an SGW and an MGW, or, triggering setup of a dedicated VoIP bearer which corresponds to the first UE and is between the SGW and a PGW, so that the first UE uses the dedicated VoIP bearer to bear a VoIP session between the first UE and the MGW after the first UE is handed over to the target access network.

According to a third aspect of the present invention, a method for a handover from a circuit switched domain to a packet switched domain is provided and includes:

receiving, by a first UE, a handover command delivered by a source access network, where the handover command carries information about a handover resource prepared by a target access network for the first UE;

accessing the target access network;

after a handover of the first UE is complete, triggering setup of a dedicated VoIP bearer which corresponds to the first UE and is between an SGW and an MGW, or triggering setup of a dedicated VoIP bearer which corresponds to the first UE and is between the SGW and a PGW; and configuring a VoIP session parameter of the dedicated VoIP bearer, so that the dedicated VoIP bearer is used to bear a VoIP session between the first UE and the MGW.

According to a fourth aspect of the present invention, a method for a handover from a circuit switched domain to a packet switched domain is provided and includes:

receiving, by a target mobility management entity, a CS to PS handover request message which corresponds to a first UE and is from an MSC, where the CS to PS handover request message carries a GTP-U tunnel prepared by an MGW for a dedicated VoIP bearer of the first UE;

sending a handover request message to a target access network, where the handover request message carries the GTP-U tunnel prepared by the MGW for the dedicated VoIP bearer of the first UE, to instruct the target access network to prepare a handover resource for the first UE, and trigger setup of a dedicated VoIP bearer which corresponds to the first UE and is between the target access network and the MGW; and sending a CS to PS handover response message corresponding to the first UE to the MSC, where the CS to PS handover response message carries the handover resource prepared by the target access network for the first UE and a GTP-U tunnel prepared by the target access network for the dedicated VoIP bearer of the first UE, so that the first UE uses the dedicated VoIP bearer to bear a VoIP session between the first UE and the MGW after the first UE is handed over to the target access network.

According to a fifth aspect of the present invention, a mobility management entity is provided and includes:

a first receiving module, configured to receive a CS to PS handover request message which corresponds to a first UE and is from a mobile switching center MSC;

a first dedicated bearer triggering module, configured to trigger setup of a dedicated voice over Internet protocol VoIP bearer which corresponds to the first UE and is between a serving gateway SGW and a media gateway MGW, or, trigger setup of a dedicated VoIP bearer which corresponds to the first UE and is between the SGW and a packet data network gateway PGW;

a first sending module, configured to send a handover request message to a target access network to instruct the target access network to prepare a handover resource for the first UE; and a second sending module, configured to send a CS to PS handover response message corresponding to the first UE to the MSC, where the CS to PS handover response message carries the handover resource prepared by the target access network for the first UE, so that the first UE uses the dedicated VoIP bearer to bear a VoIP session between the first UE and the MGW after the first UE is handed over to the target access network.

According to a sixth aspect of the present invention, a mobility management entity is provided and includes:

a third receiving module, configured to receive a CS to PS handover request message which corresponds to a first UE and is from an MSC and a PS handover request message which corresponds to the first UE and is from an SGSN;

a third sending module, configured to send a handover request message to a target access network to instruct the target access network to prepare, for the first UE, a handover resource corresponding to the PS handover request message from the SGSN;

a fourth sending module, configured to send a CS to PS handover response message corresponding to the first UE to the MSC, and send a PS handover response message corresponding to the first UE to the SGSN, where the CS to PS handover response message carries the handover resource prepared by the target access network for the first UE; and a second dedicated bearer triggering module, configured to: after a handover of the first UE is complete, trigger setup of a dedicated voice over Internet protocol VoIP bearer which corresponds to the first UE and is between an SGW and an MGW, or, trigger setup of a dedicated VoIP bearer which corresponds to the first UE and is between the SGW and a PGW, so that the first UE uses the dedicated VoIP bearer to bear a VoIP session between the first UE and the MGW after the first UE is handed over to the target access network.

According to a seventh aspect of the present invention, a user equipment is provided and includes:

a fourth receiving module, configured to receive a handover command delivered by a source access network, where the handover command carries information about a handover resource prepared by a target access network for the user equipment UE;

a handover module, configured to access the target access network;

a third triggering module, configured to: after a handover of the user equipment UE is complete, trigger setup of a dedicated VoIP bearer which corresponds to the UE and is between an SGW and a media gateway MGW, or trigger setup of a dedicated VoIP bearer which corresponds to the UE and is between the SGW and a PGW; and a parameter configuring module, configured to configure a VoIP session parameter of the dedicated VoIP bearer, so that the dedicated VoIP bearer is used to bear a VoIP session between the UE and the MGW.

According to an eighth aspect of the present invention, a mobility management entity is provided and includes:

a fifth receiving module, configured to receive a CS to PS handover request message which corresponds to a first UE and is from an MSC, where the CS to PS handover request message carries a GTP-U tunnel prepared by an MGW for a dedicated VoIP bearer of the first UE;

a fourth triggering module, configured to send a handover request message to a target access network, where the handover request message carries the GTP-U tunnel prepared by the MGW for the dedicated VoIP bearer of the first UE, to instruct the target access network to prepare a handover resource for the first UE, and trigger setup of a dedicated VoIP bearer which corresponds to the first UE and is between the target access network and the MGW; and a fifth sending module, configured to send a CS to PS handover response message corresponding to the first UE to the MSC, where the CS to PS handover response message carries the handover resource prepared by the target access network for the first UE and a GTP-U tunnel prepared by the target access network for the dedicated VoIP bearer of the first UE, so that the first UE uses the dedicated VoIP bearer to bear a VoIP session between the first UE and the MGW after the first UE is handed over to the target access network.

It may be seen from the foregoing that, according to the embodiment provided by the first aspect of the present invention, it may be implemented that the UE is handed over from the CS domain to the PS domain, and in a CS to PS handover process, the MME triggers setup of a dedicated VoIP bearer which corresponds to the UE and is between the SGW and the MGW or between the SGW and the PGW; therefore, after the UE is handed over to a target network, a voice service of the UE in the CS domain may be mapped to a VoIP session of the target network quickly; and using the set up dedicated VoIP bearer to bear a VoIP data flow of the UE helps to maintain voice continuity during an inter-domain handover of the UE.

According to the embodiments provided by the second and third aspects of the present invention, it may be implemented that the UE is handed over from the CS domain to the PS domain, and after completion of a CS to PS handover, the UE or the MME triggers setup of a dedicated VoIP bearer which corresponds to the UE and is between the SGW and the MGW or between the SGW and the PGW; therefore, after the UE is handed over to a target network, a voice service of the UE in the CS domain may be mapped to a VoIP session of the target network quickly; and using the set up dedicated VoIP bearer to bear a VoIP data flow of the UE helps to maintain voice continuity during an inter-domain handover of the UE.

According to the embodiment provided by the fourth aspect of the present invention, it may be implemented that the UE is handed over from the CS domain to the PS domain, and after completion of a CS to PS handover, the MME triggers setup of a dedicated VoIP bearer which corresponds to the UE and is between an eNB and the MGW; therefore, after the UE is handed over to a target network, a voice service of the UE in the CS domain may be mapped to a VoIP session of the target network quickly; and using the set up dedicated VoIP bearer to bear a VoIP data flow of the UE helps to maintain voice continuity during an inter-domain handover of the UE.

BRIEF DESCRIPTION OF THE DRAWINGS

To illustrate the technical solutions according to the embodiments of the present invention more clearly, accompanying drawings required for describing the embodiments are introduced below briefly. Apparently, the accompanying drawings in the following descriptions are merely some embodiments of the present invention, and persons of ordinary skill in the art may further obtain other drawings according to the accompanying drawings without creative efforts.

FIG. 1A is a schematic diagram of network deployment of a 2G/3G network and an SAE network according to an embodiment of the present invention;

FIG. 1B is a schematic flowchart of a CS to PS handover method according to a first embodiment of the present invention;

FIG. 6-*a* (A) and FIG. 6-*a* (B) are a schematic flowchart of a CS to PS handover method according to a sixth embodiment of the present invention;

FIG. 6-*b* (A) and FIG. 6-*b* (B) are a schematic flowchart of another CS to PS handover method according to the sixth embodiment of the present invention;

DETAILED DESCRIPTION OF ILLUSTRATIVE EMBODIMENTS

Figure 2A:
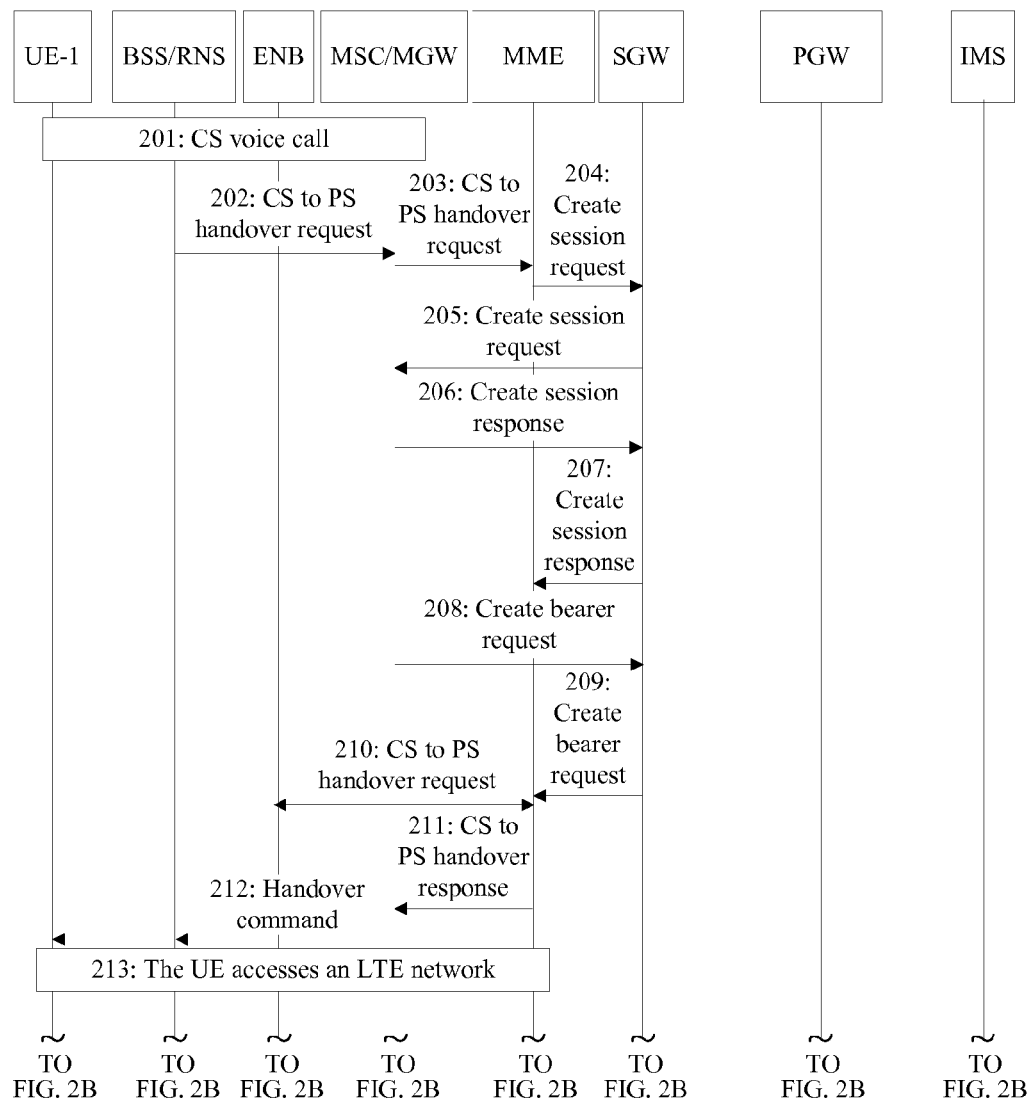
FIG. 2A and FIG. 2B are a schematic flowchart of a CS to PS handover method according to a second embodiment of the present invention.

Embodiments of the present invention provide a method for a handover from a circuit switched domain to a packet switched domain, a device, and a communications system, which help to maintain voice continuity when a UE is handed over from the CS domain to the PS domain.

The embodiments of the present invention are described in detail below.

For ease of understanding, a schematic diagram of network deployment of a 2G/3G network and an SAE network as shown in FIG. 1A is provided, where an E-UTRAN is mainly formed by an evolved NodeB (eNB, Evolution-NodeB). A core network of an evolved network includes a mobility management entity (MME, Mobility Management Entity) and an SAE gateway (SAE Gateway). The SAE gateway includes a serving gateway (SGW, Serving Gateway) and a packet data network gateway (PGW, PDN Gateway).

The MME is a control plane node of the core network in an evolved network system, and bears a function of managing user equipment (UE, User Equipment) contexts and user plane bearers; and the SGW mainly bears a function of transmitting service data, and the PGW mainly bears a function of transmitting signaling. A GERAM/UTRAN is an access network of the 2G/3G network. A mobile switching center (MSC, Mobile Switching Center) is mainly responsible for bearer control of a voice service, and a media gateway (MGW, Media Gateway) is mainly responsible for bearing a CS voice service, while a serving GPRS (general packet radio service, General Packet Radio Service) support node (SGSN, Serving GPRS Support Node) is mainly responsible for bearer control of a data service.

The technical solutions of the embodiments of the present invention mainly aim at problems about how to hand over the UE from the 2G/3G network to a pure PS domain network such as an LTE network/high-speed packet access (HSPA, High-Speed Packet Access) network and how to maintain call continuity in a handover process. In a handover procedure from the 2G/3G network to the HSPA network, a target mobility management entity corresponding to the HSPA network is an SGSN, and a corresponding access network device includes a radio network controller (RNC, Radio Network Controller).

Embodiment 1

The following first describes an embodiment of a method for a handover from a circuit switched domain to a packet switched domain according to an embodiment of the present invention from the perspective of a target mobility managing entity (for example, an MME or an SGSN). The method may include: receiving, by a target mobility management entity, a CS to PS handover request message which corresponds to a first UE and is from an MSC; triggering setup of a dedicated VoIP bearer which corresponds to the first UE and is between an SGW and an MGW, or, triggering setup of a dedicated VoIP bearer which corresponds to the first UE and is between the SGW and a PGW; sending a handover request message to a target access network to instruct the target access network to prepare a handover resource for the first UE; and sending a CS to PS handover response message corresponding to the first UE to the MSC, where the CS to PS handover response message carries the handover resource prepared by the target access network for the first UE, so that the first UE uses the dedicated VoIP bearer to bear a VoIP session between the first UE and the MGW after the first UE is handed over to the target access network.

Referring to FIG. 1B, a specific procedure may include the following.

110: A target mobility management entity receives a CS to PS handover request message which corresponds to a first UE and is from an MSC.

The target mobility management entity in this embodiment may be, for example, an MME corresponding to an LTE network, and may also be an SGSN corresponding to an HSPA network, and certainly, may also be a network entity responsible for a mobility management function in a PS network of another type; the foregoing MSC may be a visited MSC (for example, an MSC close to a target network), and may also be a serving MSC of the first UE.

In an application scenario, the CS to PS handover request message of the first UE may carry address information of an MGW, and certainly may further carry other related information.

120: The target mobility management entity triggers setup of a dedicated VoIP bearer which corresponds to the first UE and is between an SGW and the MGW, or triggers setup of a dedicated VoIP bearer which corresponds to the first UE and is between the SGW and a PGW.

In an application scenario, if a default bearer corresponding to the first UE is not set up between the SGW and the MGW, the target mobility management entity may first trigger setup of the default bearer which corresponds to the first UE and is between the SGW and the MGW, and then trigger setup of the dedicated VoIP bearer which corresponds to the first UE and is between the SGW and the MGW.

In actual applications, the target mobility management entity may trigger setup of the default bearer which corresponds to the first UE and is between the SGW and the MGW in multiple manners. One manner may include: sending a create session message carrying MGW address information to the SGW to trigger sending of a create session message to the MGW by the SGW, to set up the default bearer which corresponds to the first UE and is between the SGW and the MGW. A manner for triggering setup of the dedicated VoIP bearer which corresponds to the first UE and is between the SGW and the MGW may, for example, include: after the default bearer which corresponds to the first UE and is between the SGW and the MGW is set up, triggering sending of a create bearer message to the SGW by the MGW, to set up the dedicated VoIP bearer which corresponds to the first UE and is between the SGW and the MGW; or, after the default bearer which corresponds to the first UE and is between the SGW and the MGW is set up, sending a bearer resource command message to the SGW to trigger sending of a bearer resource command message to the MGW by the SGW, thereby further triggering initiating of a dedicated bearer setup procedure by the MGW, to set up the dedicated VoIP bearer which corresponds to the first UE and is between the SGW and the MGW.

If the dedicated VoIP bearer which corresponds to the first UE and is between the SGW and the MGW is set up, after the first UE is handed over to the target network (for example, LTE or HSPA), a voice service of the UE in a CS network may be mapped to a VoIP session of the target network, and the dedicated VoIP bearer which corresponds to the first UE and is between the SGW and the MGW is used to bear the VoIP session between the first UE and the MGW, while a transmission path of VoIP session data is: first UE<—>eNB<—>SGW<—>MGW.

In an application scenario, if a default bearer corresponding to the first UE is not set up between the SGW and the PGW, the target mobility management entity may first trigger setup of the default bearer which corresponds to the first UE and is between the SGW and the PGW, and then trigger setup of the dedicated VoIP bearer which corresponds to the first UE and is between the SGW and the PGW. If a default bearer which corresponds to the first UE and is between the SGW and the PGW is set up (for example, the first UE has a PS service in a 2G/3G network), the target mobility management entity may directly trigger setup of the dedicated VoIP bearer which corresponds to the first UE and is between the SGW and the PGW.

In actual applications, the target mobility management entity may trigger setup of the default bearer which corresponds to the first UE and is between the SGW and the PGW in multiple manners. One manner may include: sending a create session message to the SGW to trigger sending of a create session message to the PGW by the SGW, to set up the default bearer which corresponds to the first UE and is between the SGW and the PGW. A manner for triggering setup of the dedicated VoIP bearer which corresponds to the first UE and is between the SGW and the PGW may, for example, include: after the default bearer which corresponds to the first UE and is between the SGW and the PGW is set up, sending a request bearer resource command message to the SGW to trigger sending of a bearer resource command message to the PGW by the SGW, thereby further triggering initiating of a dedicated bearer setup procedure by the PGW, to set up the dedicated VoIP bearer which corresponds to the first UE and is between the SGW and the PGW.

If the dedicated VoIP bearer which corresponds to the first UE and is between the SGW and the PGW is set up, after the first UE is handed over to the target network, a voice service of the UE in a CS network may be mapped to a VoIP session of the target network, and the dedicated VoIP bearer which corresponds to the first UE and is between the SGW and the PGW is used to bear the VoIP session between the first UE and the MGW, while a transmission path of VoIP data is: first UE<—>eNB<—>SGW<—>PGW<—>MGW, and the VoIP session data may be forwarded between the PGW and the MGW in a form of an IP data packet bearer.

130: The target mobility management entity sends a handover request message to a target access network to instruct the target access network to prepare a handover resource for the first UE.

Here the target access network may correspond to an eNB in the LTE network, or correspond to an RNC in the HSPA network, and so on, or correspond to an access network device in another PS network. The handover resource prepared by the target access network for the first UE may include a resource prepared for the default bearer and a resource prepared for the dedicated bearer.

140: The target mobility management entity sends a CS to PS handover response message corresponding to the first UE to the MSC, where the CS to PS handover response message carries the handover resource prepared by the target access network for the first UE, so that the MSC instructs the first UE to access the target access network and that the first UE uses the dedicated VoIP bearer to bear the VoIP session between the first UE and the MGW after the first UE is handed over to the target access network.

Further, if a call of the first UE in a source network (2G/3G) is a video call, when the target MME triggers setup of the dedicated VoIP bearer which corresponds to the first UE and is between the SGW and the MGW, the target MME may further trigger setup of a dedicated video bearer which corresponds to the first UE and is between the SGW and the MGW, or, when the target MME triggers setup of the dedicated VoIP bearer which corresponds to the first UE and is between the SGW and the PGW, the target MME triggers setup of a dedicated video bearer which corresponds to the first UE and is between the SGW and the PGW, where the dedicated video bearer is used to bear a video session between the first UE and the MGW after the first UE accesses the target access network. A manner for setting up a dedicated video bearer is similar to the manner for setting up a dedicated VoIP bearer, and the dedicated VoIP bearer may be set up together with the dedicated video bearer.

Certainly, only the voice part in the video call of the first UE in the source network may be mapped to the target network. In this case, only the dedicated VoIP bearer may be set up, while the dedicated video bearer may not be set up.

In an application scenario, the CS to PS handover response message which corresponds to the first UE and is sent to the MSC may carry, for example, information such as the handover resource prepared by the target access network for the first UE and an address of the first UE.

After receiving the CS to PS handover response message corresponding to the first UE, the MSC may send a handover command to the first UE through the RNC, instructing the first UE to access the target access network, where the handover command may carry information such as the handover resource prepared by the target access network for the first UE.

After accessing the target access network (for example, an eNB), the first UE may configure a VoIP session parameter of the dedicated VoIP bearer, and then use the dedicated VoIP bearer to receive and send VoIP session data packets.

It may be seen from the foregoing that, according to this embodiment, it may be implemented that the UE is handed over from the CS domain to the PS domain, and in a CS to PS handover process, the target mobility management entity triggers setup of a dedicated VoIP bearer which corresponds to the UE and is between the SGW and the MGW or between the SGW and the PGW; therefore, after the UE is handed over to the target network, the voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

The following describes another embodiment of a method for a handover from a circuit switched domain to a packet switched domain according to an embodiment of the present invention from the perspective of a UE. The method may include: receiving, by a first UE, a handover command delivered by a source access network (for example, an RNC), where the handover command carries information about a handover resource prepared by the target access network for the first UE; accessing the target access network; and configuring a VoIP session parameter on a dedicated VoIP bearer, so that the dedicated VoIP bearer is used to bear a VoIP session between the first UE and an MGW.

The first UE may use a VoIP session parameter delivered by an MME (for example, use NAS signaling or a handover command) to perform parameter configuration, or use a local default VoIP session parameter to perform parameter configuration.

Further, after completion of a handover, the first UE may further initiate an IMS session domain transfer.

Embodiment 2

For ease of understanding, the following further describes the solution of the embodiment of the present invention in detail by taking a process of handing over a UE-1 from a 2G/3G network to an LTE network as an example.

In this embodiment, in the CS to PS handover process of the UE-1, an MME triggers setup of a dedicated VoIP bearer between the UE-1, an eNB, an SGW, and an MGW, and the MGW forwards uplink and downlink VoIP data packets of the UE-1.

Figure 2B:
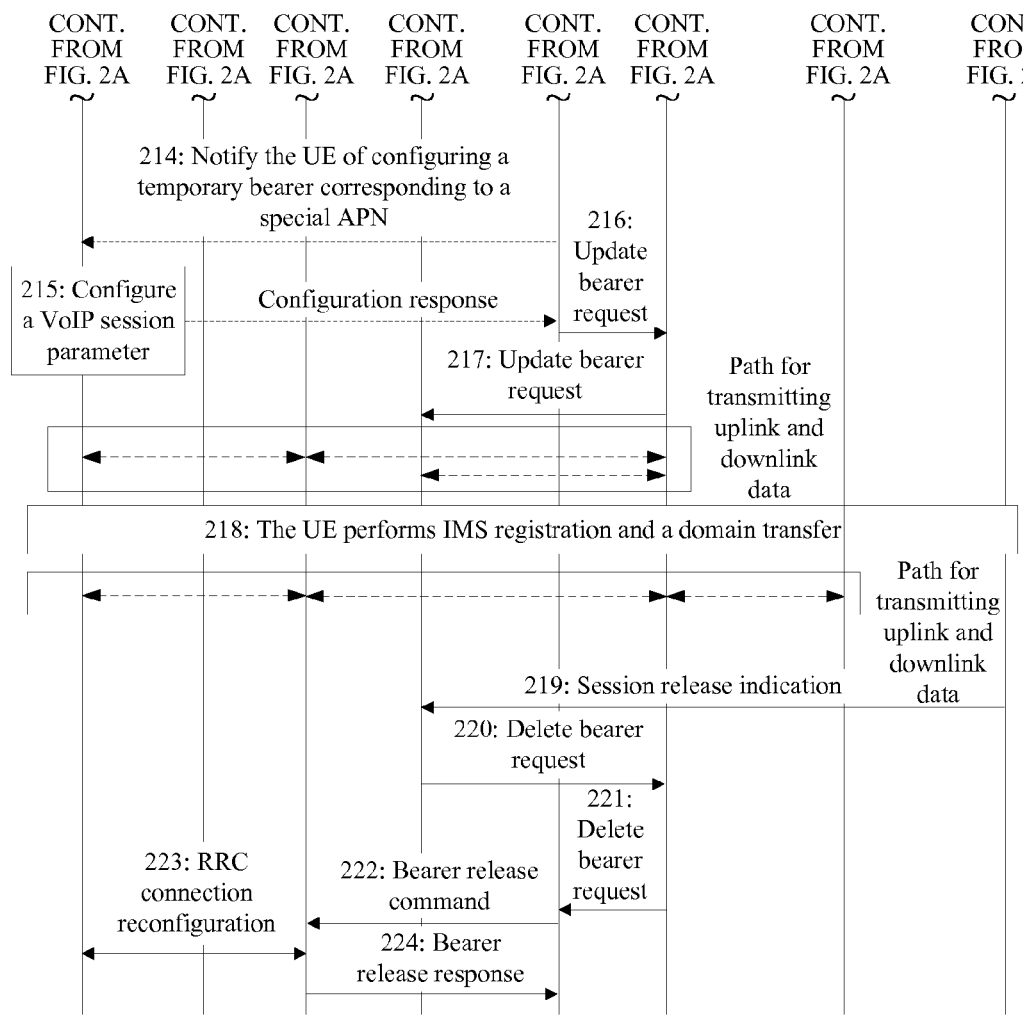

Referring to FIG. 2A and FIG. 2B, a specific process may include the following steps.

201: A UE-1 makes a CS voice call.

202: An RNS/BSS initiates a handover procedure, and sends a CS to PS handover request message corresponding to the UE-1 to a visited MSC.

The visited MSC is an MSC close to a target network (LTE network), and the visited MSC and a serving MSC of the UE-1 may be a same MSC, and may also be different MSCs. The visited MSC supports reverse single radio voice call continuity (SRVCC, Single Radio Voice Call Continuity). If the visited MSC is not a current serving MSC (serving MSC) of the UE-1, the visited MSC may actively initiate a CS to PS handover of the UE-1 according to different policies; or, the serving MSC of the UE may also initiate a CS to PS handover corresponding to the UE-1.

If the serving MSC of the UE-1 performs a CS to PS handover, the serving MSC needs to support reverse SRVCC. In actual applications, if the visited MSC is not the current serving MSC C of the UE-1, the CS to PS handover procedure which corresponds to the UE-1 and is initiated by the serving MSC of the UE-1 may include: sending, by the visited MSC, a MAP_SUB_HANDOVER message to the serving MSC of the UE-1; and further initiating, by the serving MSC of the UE-1, a CS to PS handover procedure to an MME. This embodiment mainly takes a CS to PS handover which corresponds to the UE-1 and is initiated by the visited MSC (hereinafter referred to as an MSC) as an example for illustration. It is understandable that if the visited MSC directly initiates a CS to PS handover to the MME, upgrade of the serving MSC may be avoided, and only an MSC adjacent to the LTE network needs to be upgraded, which helps to save the cost.

203: The MSC sends a CS to PS handover request message corresponding to the UE-1 to the MME.

In an application scenario, the CS to PS handover request message which corresponds to the UE-1 and is sent by the MSC to the MME may carry one or multiple pieces of the following information: CKCS and IKCS of the CS domain, KSIMSC, address and port of the MGW, CodeC used by the UE in the PS, and other information.

The CodeC used by the UE-1 in the PS may be a common CodeC selected from the CodeC supported by the UE-1 in the PS domain and the CodeC supported by the MGW, while the CodeC may be reported to the MSC in the Attach procedure, Setup procedure, or LAU procedure of the UE-1.

204: The MME receives the CS to PS handover request message which corresponds to the UE-1 and is from the MSC; the MME sends a create session request message to the SGW, where the message carries address information of the MGW, and may further carry an international mobile subscriber identity (IMSI, International Mobile Subscriber Identity) or a mobile station international ISDN number (MSISDN, Mobile Station International ISDN Number), and so on, triggering setup of a default bearer which corresponds to the UE-1 and is between the SGW and the MGW.

The create session request message sent by the MME to the SGW carries a specific APN, where the specific APN is associated with the MGW (namely, pointing to the MGW), and the APN may be configured by an operator.

Further, after receiving the CS to PS handover request message which is of the UE-1 and from the MSC, the MME may first initiate a location update procedure to an HSS, judge whether the UE-1 has subscription information in the LTE network, and if yes, trigger setup of the default bearer between the SGW and the MGW; if no, terminate the handover procedure.

205: The SGW sends a create session request message to the MGW, instructing the MGW to set up a default bearer corresponding to the UE-1 with the SGW.

The create session request message sent by the SGW to the MGW may carry a specific APN.

206: The MGW receives the create session request message from the SGW, sets up the default bearer which corresponds to the UE-1 and is between the SGW and the MGW, and may send a create session response message to the SGW.

In an application scenario, quality of service (QoS, Quality of Service) for setting up the default bearer may be generated on the MGW or configured based on the MGW, or obtained by interacting with a PCRF entity (an interface exists between the MSC/MGW and the PCRF).

After the default bearer which corresponds to the UE-1 and is between the MGW and the SGW is set up, another bearer which corresponds to the UE-1 and is between the MGW and the SGW may be further set up, for example, a dedicated VoIP bearer for bearing a VoIP session of the UE-1 may be set up.

207: The SGW sends a create session response message to the MME, indicating that the default bearer which corresponds to the UE-1 and is between the MGW and the SGW is set up completely.

208: The MGW sends a create bearer request message to the SGW, instructing setting up the dedicated VOIP bearer which corresponds to the UE-1 and is between the MGW and the SGW.

Step 208 and step 206 may be executed simultaneously, that is, the MGW may set up the default bearer of the UE-1, and meanwhile, instruct setting up the dedicated VOIP bearer which corresponds to the UE-1 and is between the MGW and the SGW.

In an application scenario, QoS for setting up the dedicated VoIP bearer may be generated on the MGW or configured based on the MGW, or obtained by interacting with the PCRF entity.

209: The SGW sends a create bearer request message to the MME, instructing the MME that the dedicated VOIP bearer which corresponds to the UE-1 and is between the MGW and the SGW is set up completely, and instructing the MME to trigger setup of a dedicated VOIP bearer which corresponds to the UE-1 and is between the SGW and an eNB.

It is understandable that during step 207, the MME may be instructed that the dedicated VOIP bearer which corresponds to the UE-1 and is between the MGW and the SGW is set up completely.

In addition, the MME may trigger setup of the VOIP bearer which corresponds to the UE-1 and is between the MGW and the SGW in the following manner, for example, the MME sends a bear resource command message to the SGW, and the SGW sends a bearer resource command message to the MGW, instructing the MGW to set up the VOIP bearer which corresponds to the UE-1 and is between the MGW and the SGW.

The MGW sends a create bearer request to the SGW; the SGW sends a create bearer request to the MME; the MME sends a create bearer response to the SGW; and the SGW sends a create bearer response to the MGW.

210: The MME initiates a handover request procedure to the eNB, and sends a handover request message corresponding to the UE-1 to the eNB, instructing the eNB to prepare a handover resource for the UE, and instructing the eNB to set up a dedicated VOIP bearer which corresponds to the UE-1 and is between the eNB and the SGW, to temporarily bear a VOIP session of the UE-1 in the LTE.

If the MME also receives keys of the CS domain and PS domain, the MME may generate a NONCE parameter (the parameter may derive an LTE key), select the CS key as a root key for deriving an LTE key to derive the LTE key, and further notify the UE-1 of using the CS key to derive the LTE key, for example, use the KSIMSC in the handover command to instruct the UE-1 to use the CS key to derive the LTE key, or directly notify the UE-1 of the LTE key.

If the eNB determines that resources are sufficient, access of the UE-1 may be allowed; if the eNB determines that resources are insufficient, access of the UE-1 may be denied. In this embodiment, that the eNB determines that resources are sufficient is taken as an example for description.

The handover resource prepared by the eNB corresponds to the default bearer and the dedicated bearer that are set up between the SGW and the MGW.

211: The MME sends a CS to PS handover response message of the UE-1 to the MSC.

It is understandable that steps 201 to 211 describe a preparation phase of the CS to PS handover of the UE-1. The following describes an execution phase of the CS to PS handover of the UE-1.

212: The MSC receives the CS to PS handover response message which is of the UE and from the MME, and sends a CS to PS handover command to the UE through an RNC, instructing the UE-1 to access the eNB, where the handover command may carry the handover resource prepared by the eNB for the UE-1, and so on.

213: The UE receives the handover command, and accesses the eNB; the UE may further send a handover complete message to the eNB; the eNB receives the handover complete message from the UE, and may further send a handover complete message to the MME, notifying the MME that a handover of the UE-1 is complete.

214: The LTE network and the UE-1 may synchronize the VoIP session parameter in multiple manners.

One manner may be: The MME delivers one or multiple of the following parameters to the UE-1: IP address of the UE-1, special APN, TFT, bearer identifier, encoding/decoding format, packetization interval, RTP payload type, MGW address, port, and so on.

The IP address of the UE-1, TFT, encoding/decoding format, packetization interval, RTP payload type, MGW address, port, and so on may be generated by the MGW, and are transferred to the MME in steps 206 to 208, or may also be transferred to the MME in step 203; the special APN and bearer identifier may be generated by the MME.

In an application scenario, the MME may send a non-access stratum (NAS) message to the UE-1 after the UE-1 accesses the LTE network, where the NAS message carries the foregoing VoIP session parameter, to notify the UE-1 of the foregoing VoIP session parameter, and the UE-1 acquires the VoIP session parameter by receiving and parsing the NAS message, and configures the dedicated VOIP bearer. Alternatively, the MME may also carry the foregoing VoIP session parameter in a handover request sent to the eNB; the eNB encapsulates the VoIP session parameter into a container and sends the container to the RNS/BSS; the RNS/BSS may carry the VoIP session parameter in a handover command to notify the UE-1; and the UE-1 implements synchronization of the VoIP session parameter with the LTE network accordingly, and configures a dedicated VOIP bearer.

A second manner may be the UE-1 and the MGW separately use a default VoIP session parameter to configure the dedicated VoIP bearer. For example, the UE-1 fixedly uses a certain private address and port to bear a VOIP flow, while the MGW fixedly uses another private address and port to bear a VOIP flow, and the UE-1 generates a TFT according to the addresses and ports. The RTP payload type may also be set according to a default value, and the encoding/decoding format may adopt an AMR (adaptive multi rate voice format), and the packetization interval and other parameters also adopt default values. A default IP address and port may be used because the MGW may differentiate, according to a GTP bearer instead of according to an IP address and port of a VOIP flow, from which UE the VOIP flow comes, that is to say, if multiple UEs use a same IP address and port, the MGW can also perform differentiation according to the GTP bearer.

215: If the UE-1 receives the VoIP session parameter delivered by the MME, the UE-1 creates configuration parameters such as APN, IP address, port, and TFT locally, and may further return a response to the MME.

After configuration of a local VoIP session parameter is complete, the UE-1 may receive and send VOIP data flows.

Further, if the UE-1 is not attached to an EPC, the MME may send a location update request message to the HSS to initiate location update, and obtain related subscription data of the UE-1 from the HSS, or, the UE-1 may execute an attach (attach) procedure to complete obtaining of the related subscription data.

216: After receiving a handover complete notification from the eNB, the MME sends an update bearer request message to the SGW, where the update bearer request message may carry a user plane address of the eNB.

217: The SGW receives the update bearer request message from the MME, and sends an update bearer request message to the MGW; the MGW and SGW update a bearer.

In this case, a transmission path of VoIP uplink data of the UE-1 is UE-1→eNB→SGW→MGW; a transmission path of VoIP downlink data of the UE-1 is MGW→SGW→eNB→UE-1.

Further, if a call of the UE-1 in a source network (2G/3G) is a video call, the MME may further trigger setup of a dedicated video bearer which corresponds to the UE-1 and is between the SGW and the MGW when triggering setup of the dedicated VoIP bearer which corresponds to the UE-1 and is between the SGW and the MGW, where the dedicated video bearer is used to bear a video session between the UE-1 and the MGW after the UE-1 accesses a target access network. A manner for setting up a dedicated video bearer is similar to the manner for setting up a dedicated VoIP bearer.

Certainly, only the voice part in the video call of the UE-1 in the source network may be mapped to the target network. In this case, only the dedicated VoIP bearer may be set up, while the dedicated video bearer may not be set up.

218: If the UE-1 has not been registered with an IMS, the UE-1 initiates IMS registration to the IMS, and initiates a domain transfer procedure.

After completion of a domain transfer, the UE-1 sets up a new bearer in the LTE network.

A transmission path of the VoIP uplink data of the UE-1 is: UE-1→eNB→SGW→PGW.

A transmission path of the VoIP downlink data of the UE-1 is: PGW→SGW→eNB→UE-1.

219: After completion of a domain transfer process, the IMS may instruct the MSC/MGW to release a corresponding session of the UE.

220: The MSC/MGW sends a delete bearer request to the SGW, initiates bearer release, and triggers release of the default bearer which corresponds to the UE-1, is between the SGW and the MGW and is set up before the domain transfer, the dedicated VOIP bearer which corresponds to the UE-1, is between the SGW and the MGW and is set up before the domain transfer, and the dedicated VOIP bearer which corresponds to the UE-1, is between the SGW and the eNB and is set up before the domain transfer. Certainly, the MSC/MGW may also release another session of the UE-1 in the CS domain. In addition, the MSC may send a delete message to the MME, and the MME triggers deletion of the default bearer and dedicated VoIP bearer between the SGW, the MGW, and the ENB.

221: The SGW sends a delete bearer request to the MME, instructing the MME to trigger deletion of the dedicated VoIP bearer which corresponds to the UE-1, is between the SGW and the eNB and is set up before the domain transfer.

222: The MME sends a delete bearer command to the eNB, instructing the eNB to delete the dedicated VoIP bearer which corresponds to the UE-1, is between the SGW and the eNB and is set up before the domain transfer.

223: The eNB receives the delete bearer command from the MME, deletes a corresponding bearer set up before the domain transfer of the UE-1, and performs RRC connection reconfiguration with the UE-1.

224: The eNB sends a bearer release response to the MME.

It is understandable that steps 214 and 216 may be executed at any time between steps 213 and 218, and that step 215 may be executed at any time between steps 213 and 218 or executed after step 203.

In addition, in a reverse SRVCC handover process, if one party of the call hangs up, the corresponding bearer may be released.

Referring to FIG. 2-b, for example, if the UE-1 hangs up, the UE-1 may initiate a PDN connection release procedure to the MME; the MME initiates bearer deletion, and the MGW notifies the MSC of releasing a session of the other party; the UE-1 and MME deactivate the bearer.

Referring to FIG. 2-C, for example, if the other party of the UE-1 hangs up, two processing solutions may be available:

Solution 1: The MSC notifies the MGW of releasing the session, and the MGW, serving as a PGW, initiates bearer release.

Solution 2: The MSC notifies the MME of releasing the session, and the MME initiates bearer release.

It may be seen from the foregoing that, according to this embodiment, it may be implemented that the UE is handed over from the CS domain to the PS domain, and in a CS to PS handover process, the MME triggers setup of a dedicated VoIP bearer which corresponds to the UE and is between the SGW and the MGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Further, after completion of a handover, the UE further performs an IMS domain transfer, which may simplify a bearing manner of VoIP data while maintaining voice continuity during the inter-domain handover of the UE.

Embodiment 3

For ease of understanding, the following still describes the solution of the embodiment of the present invention in detail by taking a process of handing over a UE-1 from a 2G/3G network to an LTE network as an example. In this embodiment, in the CS to PS handover process of the UE-1, an MME triggers setup of a dedicated VoIP bearer between the UE-1, an eNB, a SGW, and a PGW, and the PGW and the MGW exchange uplink and downlink VoIP data packets of the UE-1.

Figure 3A:
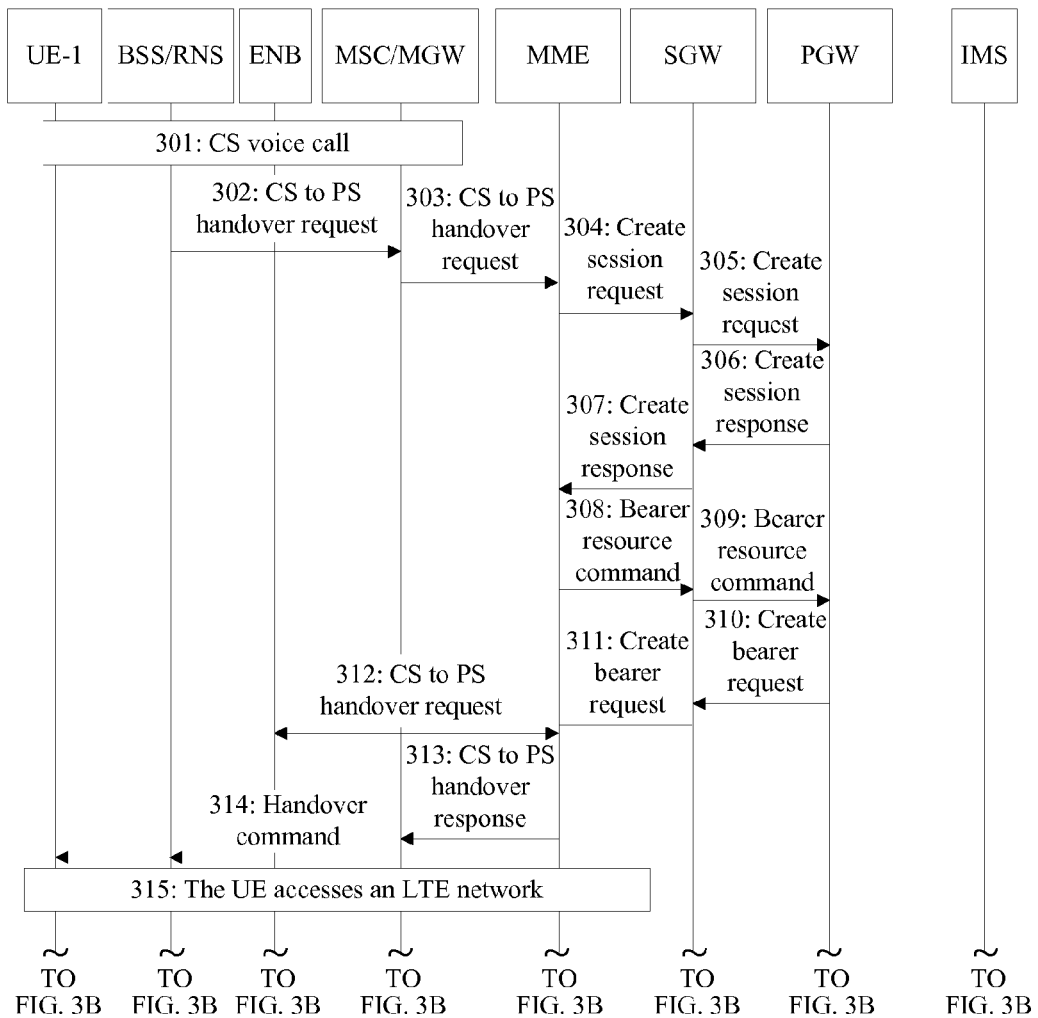
FIG. 3A and FIG. 3B are a schematic flowchart of a CS to PS handover method according to a third embodiment of the present invention.
Figure 3B:
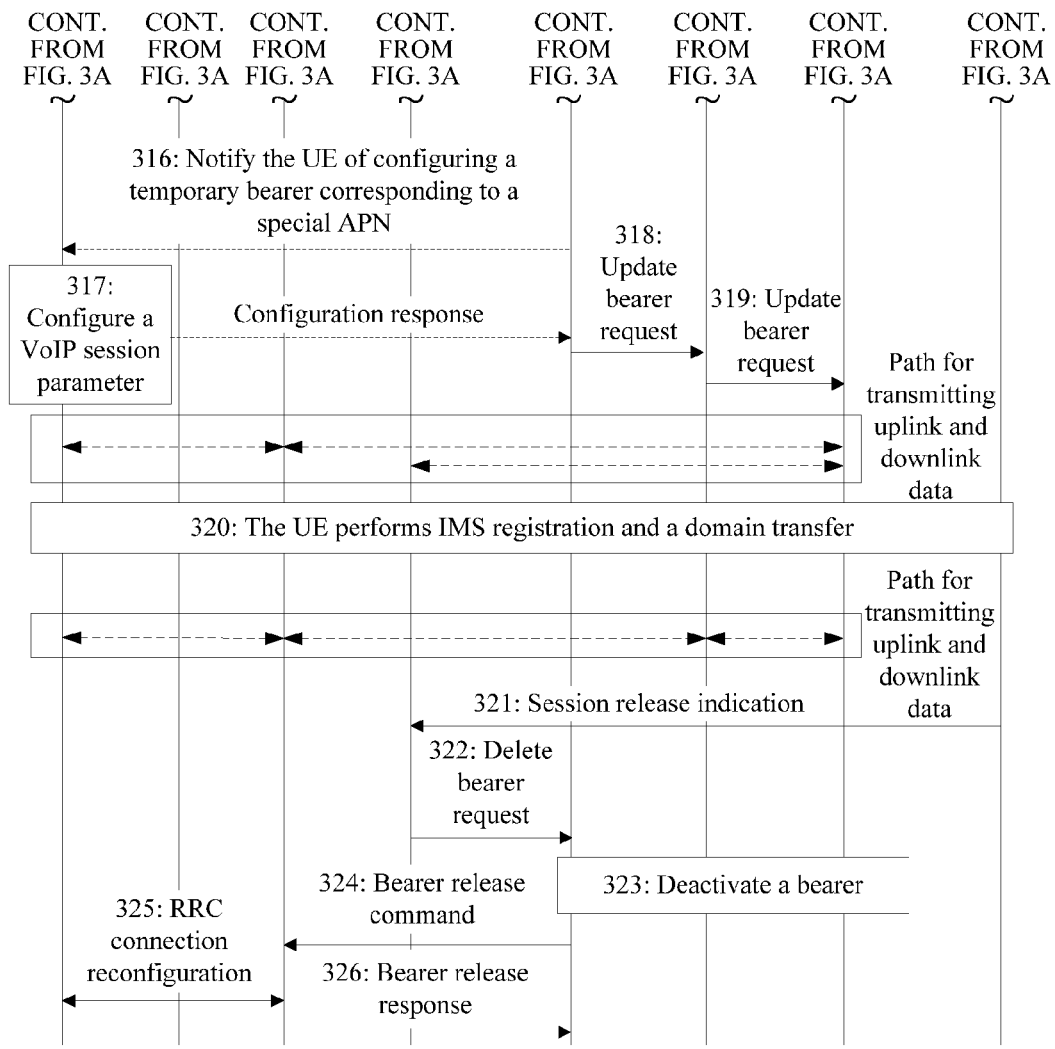

Referring to FIG. 3A and FIG. 3B, a specific process may include:

301: A UE makes a CS voice call.

302: An RNS/BSS initiates a handover procedure, and sends a CS to PS handover request message to an MSC.

A visited MSC is an MSC close to a target network (LTE network), and the visited MSC and a serving MSC of the UE-1 may be a same MSC, and may also be different MSCs. The visited MSC supports reverse SRVCC. If the visited MSC is not a current serving MSC of the UE-1, the visited MSC may actively initiate a CS to PS handover of the UE-1 according to different policies; or, the serving MSC of the UE may also initiate a CS to PS handover corresponding to the UE-1.

If the serving MSC of the UE-1 performs a CS to PS handover, the serving MSC needs to support reverse SRVCC. In actual applications, if the visited MSC is not the current serving MSC C of the UE-1, the CS to PS handover procedure which corresponds to the UE-1 and is initiated by the serving MSC of the UE-1 may include: sending, by the visited MSC, a MAP_SUB_HANDOVER message to the serving MSC of the UE-1; and further initiating, by the serving MSC of the UE-1, a CS to PS handover procedure to an MME. This embodiment mainly takes a CS to PS handover which corresponds to the UE-1 and is initiated by the visited MSC (hereinafter referred to as an MSC) as an example for illustration.

303: The MSC sends a CS to PS handover request of the UE-1 to the MME.

In an application scenario, the CS to PS handover request which is of the UE and sent by the MSC to the MME may carry one or multiple pieces of the following information: CKCS and IKCS of the CS domain, KSIMSC, address and port of the MGW, CodeC used by the UE in the PS, and other information.

The CodeC used by the UE-1 in the PS may be a common CodeC selected from the CodeC supported by the UE-1 in the PS domain and the CodeC supported by the MGW, while the CodeC may be reported to the MSC in the Attach procedure, Setup procedure, or LAU procedure of the UE-1.

304: The MME receives the CS to PS handover request message which corresponds to the UE-1 and is from the MSC.

The MME sends a create session request message to a SGW, triggering setup of a default bearer which corresponds to the UE-1 and is between the SGW and a PGW. Certainly, if the default bearer already exists, a new default bearer may not be set up.

The create session request message sent by the MME to the SGW may carry a specific APN, where the APN may be configured by an operator.

Further, after receiving the CS to PS handover request message which is of the UE-1 and from the MSC, the MME may first initiate a location update procedure to an HSS, judge whether the UE-1 has subscription information in the LTE network, and if yes, trigger setup of the default bearer between the SGW and the PGW; if no, terminate the handover procedure.

In an application scenario, a QoS parameter for setting up the foregoing default bearer may be generated on the MME or configured based on the MME.

305: The SGW sends a create session request to the PGW, instructing the PGW to set up a default bearer corresponding to the UE-1 with the SGW.

The create session request message sent by the SGW to the PGW may carry the foregoing specific APN.

306: The PGW receives the create session request message from the SGW, sets up the default bearer which corresponds to the UE-1 and is between the SGW and the PGW, and may send a create session response message to the SGW.

After the default bearer which corresponds to the UE-1 and is between the PGW and the SGW is set up, another bearer which corresponds to the UE-1 and is between the PGW and the SGW may be further set up, for example, a dedicated VoIP bearer for bearing a VoIP session of the UE-1 may be set up.

An SGi interface may be provided between the MGW and the PGW, and the MGW and the PGW may forward uplink and downlink data of the UE in a manner of sending an IP data packet. For example, a VOIP session flow between the UE-1 and the MGW may be transmitted in a manner such as setting up a virtual private network (VPN, Virtual Private Network) tunnel between the MGW and the PGW.

307: The SGW receives the create session response message from the PGW, and sends a create session response message to the MME, indicating that the default bearer which corresponds to the UE-1 and is between the MGW and the SGW is set up completely.

308: The MME sends a bearer resource command message to the SGW, triggering sending of a bearer resource command message to the PGW by the SGW, and triggering setup of a dedicated VOIP bearer which corresponds to the UE-1 and is between the PGW and the SGW.

309: The SGW sends a bearer resource command message to the PGW to set up a dedicated VOIP bearer which corresponds to the UE-1 and is between the PGW and the SGW.

310: The PGW receives the bearer resource command message from the SGW, and sends a create bearer request message to the SGW, instructing the SGW to set up the dedicated VOIP bearer which corresponds to the UE-1 and is between the PGW and the SGW.

In an application scenario, QoS for setting up the default bearer may be generated on the PGW or configured based on the PGW, or obtained by interacting with a PCRF entity.

311: The SGW sends a create bearer request message to the MME, instructing the MME that the dedicated VOIP bearer which corresponds to the UE-1 and is between the MGW and the SGW is set up completely, and instructing the MME to trigger setup of a dedicated VOIP bearer which corresponds to the UE-1 and is between the SGW and an eNB.

312: The MME sends a handover request message corresponding to the UE-1 to the eNB, instructing the eNB to prepare a handover resource for the UE, and instructing the eNB to set up a dedicated VOIP bearer which corresponds to the UE-1 and is between the eNB and the SGW, to temporarily bear a VOIP session of the UE-1 in the LTE network.

If the MME also receives keys of the CS domain and PS domain, the MME may generate a NONCE parameter, select the CS key as a root key for deriving an LTE key to derive the LTE key, and further notify the UE-1 of using the CS key to derive the LTE key, for example, use the KSIMSC in the handover command to instruct the UE-1 to use the CS key to derive the LTE key, or directly notify the UE-1 of the LTE key.

If the eNB determines that resources are sufficient, access of the UE-1 may be allowed; if the eNB determines that resources are insufficient, access of the UE-1 may be denied. In this embodiment, that the eNB determines that resources are sufficient is taken as an example for description.

313: The MME sends a CS to PS handover response message of the UE-1 to the MSC, where the message may carry information such as an IP address/port allocated by the PGW to the UE-1, and information about a handover resource prepared by the eNB for the UE-1.

It is understandable that steps 301 to 313 describe a preparation phase of the CS to PS handover of the UE-1. The following describes an execution phase of the CS to PS handover of the UE-1. B. Description about steps of the handover execution phase:

314: The MSC receives the CS to PS handover response message which is of the UE-1 and from the MME, and sends a CS to PS handover command to the UE-1 through an RNC, instructing the UE-1 to access the eNB.

The handover command carries the information about a handover resource prepared by the eNB for the UE-1.

315: The UE-1 receives the handover command, and accesses the eNB; the UE-1 may further send a handover complete message to the eNB; the eNB receives the handover complete message from the UE-1, and may further send a handover complete message to the MME, notifying the MME that the handover of the UE-1 is complete.

316: The LTE network and the UE-1 may synchronize a VoIP session parameter in multiple manners.

One manner may be: The MME delivers one or multiple of the following parameters to the UE-1: IP address of the UE-1, special APN, TFT, bearer identifier, encoding/decoding format, packetization interval, RTP payload type, MGW address, port, and so on.

The IP address of the UE-1, TFT, encoding/decoding format, packetization interval, RTP payload type, MGW address, port, and so on may be generated by the MGW, and may be transferred to the MME in multiple manners, for example, transferred to the MME in step 303; the special APN and bearer identifier may be generated by the MME.

In an application scenario, the MME may send a non-access stratum (NAS, Non-Access Statun) message to the UE-1 after the UE-1 accesses the LTE network, where the NAS message carries the foregoing VoIP session parameter, to notify the UE-1 of the foregoing VoIP session parameter, and the UE-1 acquires the VoIP session parameter by receiving and parsing the NAS message, and configures the dedicated VoIP bearer. Alternatively, the MME may also carry the foregoing VoIP session parameter in a handover request sent to the eNB; the eNB encapsulates the VoIP session parameter into a container and sends the container to the RNS/BSS; the RNS/BSS may carry the VoIP session parameter in a handover command to notify the UE-1; and the UE-1 implements synchronization of the VoIP session parameter with the LTE network accordingly, and configures a dedicated VOIP bearer.

A second manner may be: The UE-1 and the MGW separately use a default VoIP session parameter to configure the dedicated VoIP bearer. For example, the UE-1 fixedly uses a certain private address and port to bear a VOIP flow, while the MGW fixedly uses another private address and port to bear a VOIP flow, and the UE-1 generates a TFT according to the addresses and ports. The RTP payload type may also be set according to a default value, and the encoding/decoding format may adopt an AMR (adaptive multirate voice format), and the packetization interval and other parameters adopt default values.

317: If the UE-1 receives the VoIP session parameter delivered by the MME, the UE-1 creates configuration parameters such as APN, IP address, port, and TFT locally, and may further return a response to the MME.

After configuration of a local VoIP session parameter is complete, the UE may receive and send VOIP data flows.

In addition, if the MME does not deliver the VoIP session parameter to the UE-1, the UE-1 may use a default parameter to locally configure a dedicated VoIP bearer.

Further, if the UE-1 is not attached to an EPC, the MME may send a location update request message to the HSS to initiate location update, and obtain related subscription data of the UE-1 from the HSS, or, the UE-1 may execute an attach (attach) procedure to complete obtaining of the related subscription data.

318: After receiving the handover complete message from the eNB, the MME sends an update bearer request message to the SGW, where the update bearer request message may carry user plane address information of the eNB.

319: The SGW receives the update bearer request message from the MME, and sends an update bearer request message to the PGW; the PGW and SGW update a bearer.

In this case, a transmission path of VoIP uplink data of the UE-1 is UE-1→eNB→SGW→PGW→MGW; a transmission path of VoIP downlink data of the UE-1 is MGW→PGW→SGW→eNB→UE-1.

Further, the PGW and MGW may further consider setup of a VPN channel, to ensure that the PGW and MGW can smoothly forward the uplink and downlink data of the UE-1.

Further, if a call of the UE-1 in a source network (2G/3G) is a video call, the MME may further trigger setup of a dedicated video bearer which corresponds to the UE-1 and is between the SGW and the PGW when triggering setup of a dedicated VoIP bearer which corresponds to the UE-1 and is between the SGW and the PGW, where the dedicated video bearer is used to bear a video session between the UE-1 and the MGW after the UE-1 accesses a target access network. A manner for setting up a dedicated video bearer is similar to the manner for setting up a dedicated VoIP bearer.

Certainly, only the voice part in the video call of the UE-1 in the source network may be mapped to the target network. In this case, only the dedicated VoIP bearer may be set up, while the dedicated video bearer may not be set up.

320: If the UE-1 has not been registered with an IMS, the UE-1 initiates IMS registration to the IMS, and initiates a domain transfer procedure.

After completion of a domain transfer, the UE-1 sets up a new bearer in the LTE network.

A transmission path of the VoIP uplink data of the UE-1 is: UE-1→eNB→SGW→PGW.

A transmission path of the VoIP downlink data of the UE-1 is: PGW→SGW→eNB→UE-1.

321: After completion of the domain transfer, the IMS may further instruct the MSC/MGW to release a corresponding session of the UE-1, and may further instruct the MME through the MSC to initiate release of a temporary session.

322: The MSC/MGW releases the session of the UE-1 in the CS domain, sends a delete bearer request to the MME, initiates bearer release, and triggers release of the dedicated VOIP bearer which corresponds to the UE-1, is between the SGW and the eNB and is set up before the domain transfer, and the dedicated VOIP bearer which corresponds to the UE-1, is between the SGW and the PGW and is set up before the domain transfer.

323: The MME receives the delete bearer request from the MSC/MGW, sends a delete bearer command to the SGW, and triggers release of the dedicated VOIP bearer which corresponds to the UE-1 and is between the SGW and the PGW. The SGW sends a delete bearer command to the PGW and releases a corresponding bearer.

324: The MME sends a delete bearer command to the eNB, instructing the eNB to delete the dedicated VoIP bearer which corresponds to the UE-1, is between the SGW and the eNB and is set up before the domain transfer.

325: The eNB receives the delete bearer command from the MME, deletes the corresponding bearer set up before the domain transfer of the UE-1, and performs RRC connection reconfiguration with the UE-1.

326: The eNB sends a bearer release response to the MME.

It is understandable that steps 315 and 318 may be executed at any time between steps 313 and 320, and that step 316 may be executed at any time between steps 314 and 320 or executed after step 303.

It may be seen from the foregoing that, according to this embodiment, it may be implemented that the UE is handed over from the CS domain to the PS domain, and in a CS to PS handover process, the MME triggers setup of a dedicated VoIP bearer which corresponds to the UE and is between the SGW and the PGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Further, after completion of a handover, the UE further performs an IMS domain transfer, which may simplify a bearing manner of VoIP data while maintaining voice continuity during the inter-domain handover of the UE.

Embodiment 4

The following describes an embodiment of a method for a handover from a circuit switched domain to a packet switched domain according to an embodiment of the present invention from the perspective of a target mobility management entity (for example, an MME or an SGSN). The method may include: receiving, by a target mobility management entity, a CS to PS handover request message which corresponds to a first UE and is from an MSC and a PS handover request message which corresponds to the first UE and is from an SGSN; sending a handover request message to a target access network to instruct the target access network to prepare, for the first UE, a handover resource corresponding to the PS handover request message from the SGSN; sending a CS to PS handover response message corresponding to the first UE to the MSC and sending a PS handover response message corresponding to the first UE to the SGSN, where the CS to PS handover response message carries the handover resource prepared by the target access network for the first UE; and after a handover of the first UE is complete, triggering setup of a dedicated VoIP bearer which corresponds to the first UE and is between an SGW and an MGW, or triggering setup of a dedicated VoIP bearer which corresponds to the first UE and is between the SGW and a PGW, so that the first UE uses the dedicated VoIP bearer to bear a VoIP session between the first UE and the MGW after the first UE is handed over to the target access network.

Figure 4:
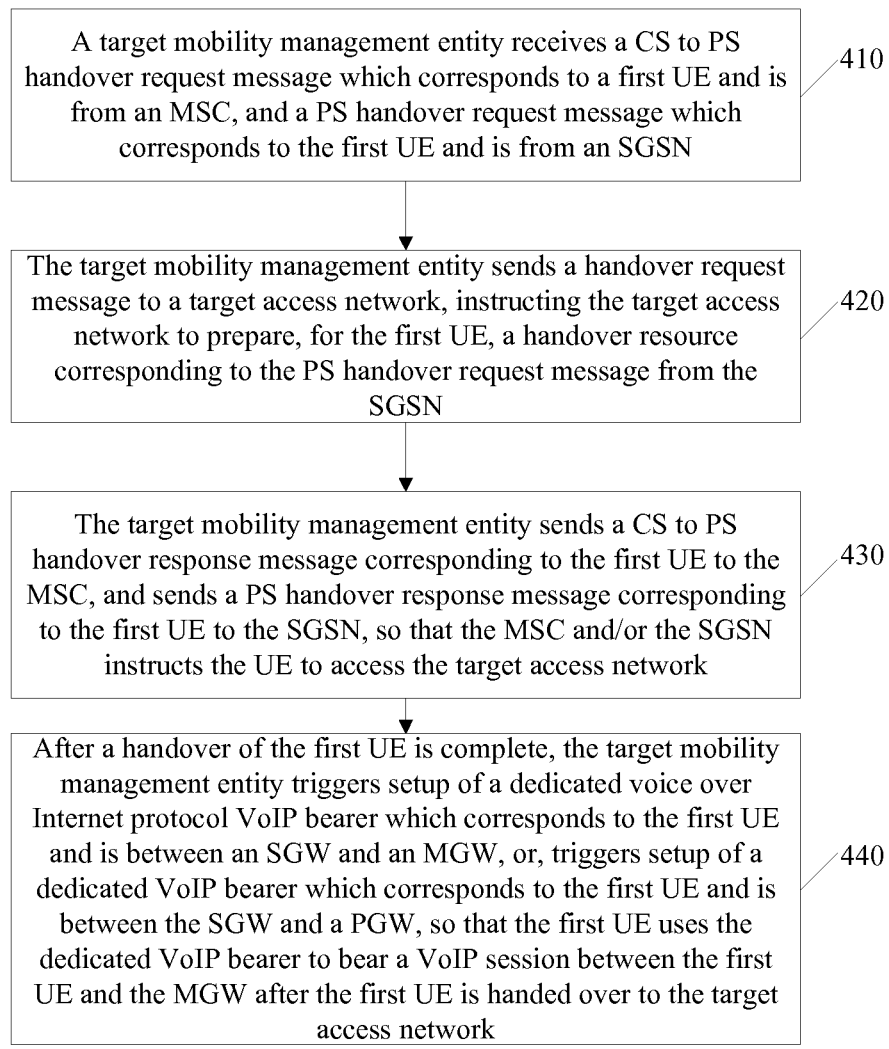
FIG. 4 is a schematic flowchart of a CS to PS handover method according to a fourth embodiment of the present invention.

The technical solution of this embodiment mainly aims at a scenario where before the handover, the first UE has a PS service in a 2G/3G network. After the handover of the first UE is complete, the target mobility management entity triggers setup of a dedicated VoIP bearer. Referring to FIG. 4, a specific procedure may include:

410: A target mobility management entity receives a CS to PS handover request message which corresponds to a first UE and is from an MSC and a PS handover request message which corresponds to the first UE and is from an SGSN.

The target mobility management entity in this embodiment may be, for example, an MME corresponding to an LTE network, and may also be an SGSN corresponding to an HSPA network, and certainly, may be a network entity responsible for a mobility management function in a PS network of another type; the foregoing MSC may be a visited MSC (for example, an MSC close to a target network), and may also be a serving MSC of the first UE; the SGSN is an SGSN in a 2G/3G network.

In an application scenario, the CS to PS handover request message of the first UE may carry address information of an MGW, and certainly may further carry other related information.

420: The target mobility management entity sends a handover request message to a target access network, instructing the target access network to prepare, for the first UE, a handover resource corresponding to the PS handover request message from the SGSN.

Here the target access network may correspond to an eNB in the LTE network, or correspond to an RNC in the HSPA network, and so on, or correspond to an access network device in another PS network.

The target access network prepares the handover resource corresponding to the PS handover request message from the SGSN to hand over a PS service of the first UE in the 2G/3G network to the target network.

430: The target mobility management entity sends a CS to PS handover response message corresponding to the first UE to the MSC, and sends a PS handover response message corresponding to the first UE to the SGSN, where the CS to PS handover response message carries the handover resource prepared by the target access network for the first UE, so that the MSC and/or the SGSN instructs the UE to access the target access network.

In an application scenario, the PS handover response message which corresponds to the first UE and is sent to the MSC may carry, for example, information such as the handover resource prepared by the target access network for the first UE, and an address of the first UE (the address may be a default IP address).

After receiving the CS to PS handover response message corresponding to the first UE, the MSC and the SGSN may send a handover command to the first UE through the RNC, instructing the first UE to access the target access network, where the handover command may carry information such as the handover resource prepared by the target access network for the first UE.

440: After a handover of the first UE is complete, the target mobility management entity triggers setup of a dedicated voice over Internet protocol VoIP bearer which corresponds to the first UE and is between an SGW and the MGW, or, triggers setup of a dedicated VoIP bearer which corresponds to the first UE and is between the SGW and a PGW, so that the first UE uses the dedicated VoIP bearer to bear a VoIP session between the first UE and the MGW after the first UE is handed over to the target access network.

The first UE may configure a VoIP session parameter for the dedicated VoIP bearer, and then may use the dedicated VoIP bearer to receive and send VoIP session data packets.

Further, if a call of the first UE in a source network (2G/3G) is a video call, when the MME triggers setup of the dedicated VoIP bearer which corresponds to the first UE and is between the SGW and the MGW, the MME may further trigger setup of a dedicated video bearer which corresponds to the first UE and is between the SGW and the MGW, or, when the MME triggers setup of the dedicated VoIP bearer which corresponds to the first UE and is between the SGW and the PGW, the MME triggers setup of a dedicated video bearer which corresponds to the first UE and is between the SGW and the PGW, where the dedicated video bearer is used to bear a video session between the first UE and the MGW after the first UE accesses the target access network. A manner for setting up a dedicated video bearer is similar to the manner for setting up a dedicated VoIP bearer.

Certainly, only the voice part in the video call of the first UE in the source network may be mapped to the target network. In this case, only the dedicated VoIP bearer may be set up, while the dedicated video bearer may not be set up.

It may be seen from the foregoing that, according to this embodiment, it may be implemented that the UE is handed over from the CS domain to the PS domain, and after completion of the CS to PS handover, the target mobility management entity triggers setup of a dedicated VoIP bearer which corresponds to the UE and is between the SGW and the MGW or between the SGW and the PGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Embodiment 5

The following describes another embodiment of a method for a handover from a circuit switched domain to a packet switched domain according to an embodiment of the present invention from the perspective of a user equipment. The method may include: receiving, by a first UE, a handover command delivered by a source access network, where the handover command carries information about a handover resource prepared by a target access network for the first UE; accessing the target access network; after a handover of the first UE is complete, triggering setup of a dedicated voice over Internet protocol VoIP bearer which corresponds to the first UE and is between a serving gateway SGW and a media gateway MGW, or, triggering setup of a dedicated VoIP bearer which corresponds to the first UE and is between the SGW and a packet data network gateway PGW; and configuring a VoIP session parameter of the dedicated VoIP bearer of the first UE, so that the dedicated VoIP bearer is used to bear a VoIP session between the first UE and the MGW.

Figure 5:
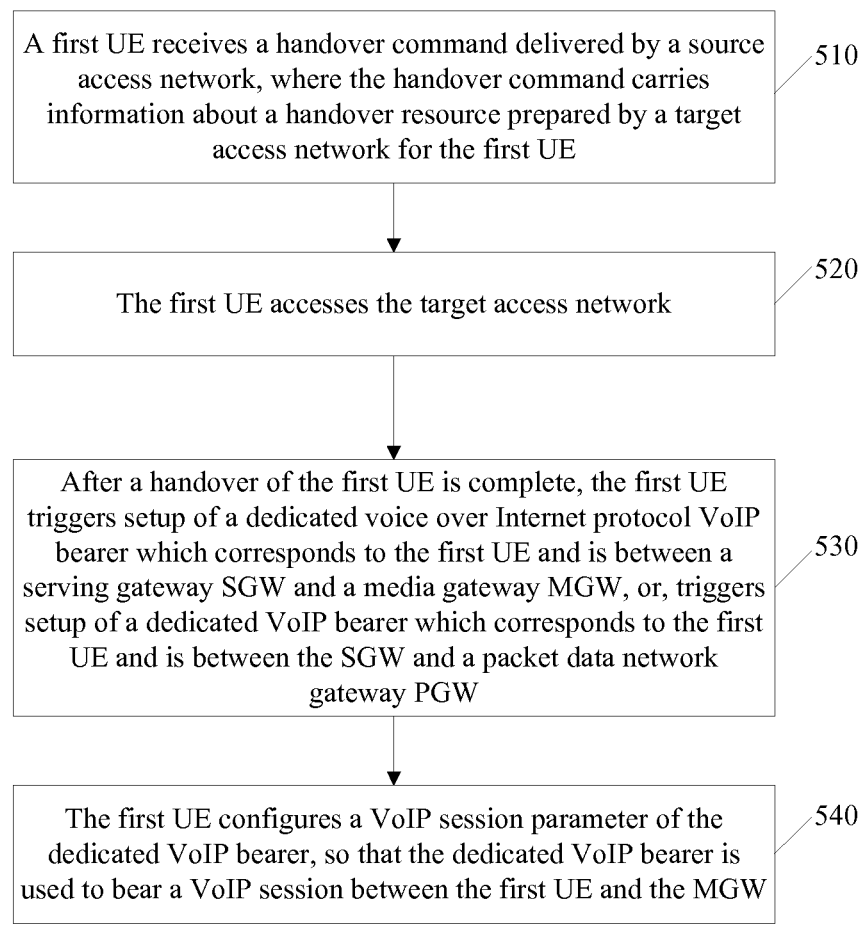
FIG. 5 is a schematic flowchart of a CS to PS handover method according to a fifth embodiment of the present invention.

The technical solution of this embodiment mainly aims at a scenario where before the handover, the first UE has a PS service in a 2G/3G network. After the handover of the first UE is complete, a target mobility management entity triggers setup of a dedicated VoIP bearer. Referring to FIG. 5, a specific procedure may include:

510: A first UE receives a handover command delivered by a source access network, where the handover command carries information about a handover resource prepared by a target access network for the first UE.

Here the source access network is, for example, an RNC in a 2G/3G network; the target access network may correspond to an eNB in an LTE network, or an RNC in an HSPA network, and so on, or correspond to an access network device in another PS network.

520: The first UE accesses the target access network.

530: After a handover of the first UE is complete, the first UE triggers setup of a dedicated voice over Internet protocol VoIP bearer which corresponds to the first UE and is between a serving gateway SGW and a media gateway MGW, or, triggers setup of a dedicated VoIP bearer which corresponds to the first UE and is between the SGW and a packet data network gateway PGW.

540: The first UE configures a VoIP session parameter of the dedicated VoIP bearer, so that the dedicated VoIP bearer is used to bear a VoIP session between the first UE and the MGW.

Further, if a call of the first UE in a source network (2G/3G) is a video call, when the MME triggers setup of the dedicated VoIP bearer which corresponds to the first UE and is between the SGW and the MGW, the MME may further trigger setup of a dedicated video bearer which corresponds to the first UE and is between the SGW and the MGW, or, when the MME triggers setup of the dedicated VoIP bearer which corresponds to the first UE and is between the SGW and the PGW, the MME further triggers setup of a dedicated video bearer which corresponds to the first UE and is between the SGW and the PGW, where the dedicated video bearer is used to bear a video session between the first UE and the MGW after the first UE accesses the target access network. A manner for setting up a dedicated video bearer is similar to the manner for setting up a dedicated VoIP bearer.

Certainly, only the voice part in the video call of the first UE in the source network may be mapped to a target network. In this case, only the dedicated VoIP bearer may be set up, while the dedicated video bearer may not be set up.

It may be seen from the foregoing that, according to this embodiment, it may be implemented that the UE is handed over from the CS domain to the PS domain, and after completion of the CS to PS handover, the UE triggers setup of a dedicated VoIP bearer which corresponds to the UE and is between the SGW and the MGW or between the SGW and the PGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Embodiment 6

This embodiment aims at a scenario where a UE also has a PS service in a 2G/3G network; in a CS to PS handover process, a default bearer and a dedicated VoIP bearer may not be set up in a target network (LTE or HSPA); after completion of the handover, the UE or an MME initiates setup/modification of the dedicated VoIP bearer.

Referring to FIG. 6-a (A) and FIG. 6-a (B), a specific process may include:

601: A UE makes a CS voice call.

602: An RNS/BSS initiates a handover procedure, sends a CS to PS handover request message to a visited MSC, and sends a PS handover request message to an SGSN.

The visited MSC and a serving MSC of the UE-1 may be a same MSC, and may also be different MSCs. The visited MSC supports reverse SRVCC. If the visited MSC is not a current serving MSC of the UE-1, the visited MSC may actively initiate a CS to PS handover of the UE-1 according to different policies; or, the serving MSC of the UE may also initiate a CS to PS handover corresponding to the UE-1.

If the serving MSC of the UE-1 performs a CS to PS handover, the serving MSC needs to support reverse SRVCC. In actual applications, if the visited MSC is not the current serving MSC C of the UE-1, the CS to PS handover procedure which corresponds to the UE-1 and is initiated by the serving MSC of the UE-1 may include: sending, by the visited MSC, a MAP_SUB_HANDOVER message to the serving MSC of the UE-1; and further initiating, by the serving MSC of the UE-1, a CS to PS handover procedure to an MME. This embodiment mainly takes a CS to PS handover which corresponds to the UE-1 and is initiated by the visited MSC (hereinafter referred to as an MSC) as an example for illustration.

603: The MSC sends a CS to PS handover request message corresponding to the UE-1 to the MME; the SGSN sends a PS handover request message corresponding to the UE-1 to the MME.

In an application scenario, the CS to PS handover request message which corresponds to the UE-1 and is sent by the MSC to the MME may carry one or multiple pieces of the following information: CKCS and IKCS of the CS domain, KSIMSC, address and port of the MGW, CodeC used by the UE in the PS, and other information.

The CodeC used by the UE-1 in the PS may be a common CodeC selected from the CodeC supported by the UE-1 in the PS domain and the CodeC supported by the MGW, while the CodeC may be reported to the MSC in the Attach procedure, Setup procedure, or LAU procedure of the UE-1.

604: The MME receives the CS to PS handover request which is of the UE-1 and sent by the MSC and the PS handover request which is of the UE-1 and sent by the SGSN; the MME initiates a handover request procedure to an eNB, and sends a corresponding handover request message to the eNB, instructing the eNB to prepare, for the UE-1, a handover resource of the handover request message which is of the UE and sent by the SGSN.

Here the MME only instructs the eNB to prepare, for the UE-1, the handover resource of the handover request message which is of the UE and sent by the SGSN, to first hand over a PS service in a 2G/3G network.

If the MME also receives keys of the CS domain and PS domain, the MME may generate a NONCE parameter, select the CS key as a root key for deriving an LTE key to derive the LTE key, and further notify the UE of using the CS key to derive the LTE key, for example, use the KSIMSC in the handover command to instruct the UE to use the CS key to derive the LTE key.

Further, after receiving the CS to PS handover request message which is of the UE-1 and from the MSC and the PS handover request which is of the UE-1 and sent by the SGSN, the MME may first initiate a location update procedure to an HSS, judge whether the UE-1 has subscription information in an LTE network, and if yes, trigger setup of a default bearer between the SGW and the MGW; if no, terminate the handover procedure.

605: The MME sends a CS to PS handover response message corresponding to the UE-1 to the MSC, and the MME sends a PS handover response message to the SGSN.

The PS handover response message carries information about a handover resource prepared by the eNB for the UE-1, and may further carry address information of the UE-1.

Before the handover, the UE-1 has the PS service; a PDN connection has been set up between the SGSN and the SGW/PGW; in the handover preparation process, the MME, SGW, and MGW do not initiate setup of the default bearer and the dedicated VoIP bearer.

Further, if a dedicated VoIP bearer between the UE-1, the SGW, and the PGW needs to be set up subsequently, the CS to PS handover response message may further include an IP address/port allocated by the PGW to the UE-1.

It is understandable that steps 601 to 605 describe a preparation phase of the CS to PS handover of the UE-1. The following describes an execution phase of the CS to PS handover of the UE-1.

606: The MSC receives the CS to PS handover response message which is of the UE-1 and from the MME, and sends a CS to PS handover command to the UE-1 through an RNC, instructing the UE-1 to access the eNB.

The SGSN receives the PS handover response message which is of the UE-1 and from the MME, and sends a PS handover command to the UE through the RNC, instructing the UE-1 to access the eNB.

In an application scenario, the RNC may combine the handover commands from the SGSN and the MSC, and send a combined handover command to the UE-1, where the combined handover command carries information about a handover resource prepared by the eNB for the UE-1.

607: The UE-1 receives the handover command, and accesses the eNB; the UE-1 may further send a handover complete message to the eNB; the eNB receives the handover complete message from the UE-1, and may further send a handover complete message to the MME, notifying the MME that the handover of the UE-1 is complete.

608: The UE-1 or the MME triggers setup of a default bearer and a dedicated VoIP bearer which correspond to the UE-1 and are between the eNB and the SGW and between the SGW and the MGW.

For a process of setting up the dedicated VoIP bearer, reference may be made to related description in the second embodiment.

For example, if the UE-1 initiates setup of the dedicated VoIP bearer or the UE-1 initiates modification of the bearer resource, a network delivers parameters such as MGW address, port, CodeC, or QoS to the UE-1 through a handover command (eNB) or NAS signaling (MME).

The UE-1 initiates setup of a dedicated VoIP bearer according to the foregoing parameters. The UE-1 may also initiate setup of a dedicated VoIP bearer by using a default parameter.

If the MME initiates setup of the dedicated VoIP bearer, the MME initiates a bearer resource command procedure after receiving the handover complete message to trigger setup of the dedicated VoIP bearer.

609: The LTE network and the UE may synchronize a configuration parameter in multiple manners.

One manner may be: The MME delivers one or multiple of the following parameters to the UE-1: IP address of the UE-1, special APN, TFT, bearer identifier, encoding/decoding format, packetization interval, RTP payload type, MGW address, port, and so on.

In an application scenario, the MME may send a non-access stratum (NAS, Non-Access Statun) message to the UE-1 after the UE-1 accesses the LTE network, where the NAS message carries the foregoing VoIP session parameter to notify the UE-1 of the foregoing VoIP session parameter, and the UE-1 acquires the VoIP session parameter by receiving and parsing the NAS message, and performs configuration. Alternatively, the MME may also carry the foregoing VoIP session parameter in a handover request sent to the eNB; the eNB encapsulates the VoIP session parameter into a container and sends the container to the RNS/BSS; the RNS/BSS may carry the VoIP session parameter in a handover command to notify the UE-1; and the UE-1 implements synchronization of the VoIP session parameter with the LTE network accordingly.

A second method may be: The UE-1 and the MGW separately use a default VoIP session parameter to configure the dedicated VoIP bearer. For example, the UE-1 fixedly uses a certain private address and port to bear a VOIP flow, while the MGW fixedly uses another private address and port to bear a VOIP flow, and the UE-1 generates a TFT according to the addresses and ports. The RTP payload type may also be set according to a default value, and the encoding/decoding format may adopt an AMR (adaptive multirate voice format), and the packetization interval and other parameters also adopt default values.

610: If the UE-1 receives the VoIP session parameter delivered by the MME, the UE-1 creates configuration parameters such as APN, IP address, port, and TFT locally, and may further return a response to the MME.

After configuration of the VoIP session parameter is complete, the UE may receive and send VOIP data flows.

In addition, if the MME does not deliver the VoIP session parameter to the UE-1, the UE-1 may use a default parameter to locally configure a dedicated VoIP bearer.

Further, if the UE-1 is not attached to an EPC, the MME may send a location update request message to an HSS to initiate location update, and obtain related subscription data of the UE-1 from the HSS, or, the UE-1 may execute an attach (attach) procedure to complete obtaining of the related subscription data.

611: After receiving a handover complete notification, the MME sends an update bearer request message to the SGW, where the update bearer request message may carry a user plane address of the eNB.

612: The SGW receives the update bearer request message from the MME, and sends an update bearer request message to the MGW; the MGW and SGW update a bearer.

In this case, a transmission path of VoIP uplink data of the UE-1 is UE-1→eNB→SGW→MGW; a transmission path of VoIP downlink data of the UE-1 is MGW→SGW→eNB→UE-1.

Further, if a call of the UE-1 in a source network (2G/3G) is a video call, the MME may further trigger setup of a dedicated video bearer which corresponds to the UE-1 and is between the SGW and the MGW when triggering setup of a dedicated VoIP bearer which corresponds to the UE-1 and is between the SGW and the MGW, where the dedicated video bearer is used to bear a video session between the UE-1 and the MGW after the UE-1 accesses a target access network. A manner for setting up a dedicated video bearer is similar to the manner for setting up a dedicated VoIP bearer.

Certainly, only the voice part in the video call of the UE-1 in the source network may be mapped to a target network. In this case, only the dedicated VoIP bearer may be set up, while the dedicated video bearer may not be set up.

613: If the UE-1 has not been registered with an IMS, the UE-1 initiates IMS registration, and initiates an IMS domain transfer procedure.

614: After completion of an IMS domain transfer process, the IMS may instruct the MSC/MGW to release a corresponding session of the UE.

After completion of a domain transfer, the UE-1 sets up a new bearer in the LTE network.

A transmission path of the VoIP uplink data of the UE-1 is: UE-1→eNB→SGW→PGW.

A transmission path of the VoIP downlink data of the UE-1 is: PGW→SGW→eNB→UE-1.

615: The MSC/MGW sends a delete bearer request to the SGW, initiates bearer release, and triggers release of the default bearer which corresponds to the UE-1, is between the SGW and the MGW and is set up before the domain transfer, and the dedicated VOIP bearer which corresponds to the UE-1, is between the SGW and the MGW and is set up before the domain transfer, and the dedicated VOIP bearer which corresponds to the UE-1, is between the SGW and the eNB and is set up before the domain transfer. Certainly, the MSC/MGW may also release another session of the UE-1 in the CS domain.

616: The SGW sends a delete bearer request to the MME, instructing the MME to trigger deletion of the dedicated VoIP bearer which corresponds to the UE-1, is between the SGW and the eNB and is set up before the domain transfer.

617: The MME sends a delete bearer command to the eNB, instructing the eNB to delete the dedicated VoIP bearer which corresponds to the UE-1, is between the SGW and the eNB and is set up before the domain transfer.

618: The eNB receives the delete bearer command from the MME, deletes the corresponding bearer set up before the domain transfer of the UE-1, and performs RRC connection reconfiguration with the UE-1.

619: The eNB sends a bearer release response to the MME.

In addition, referring to FIG. 6-*b* (A) and FIG. 6-*b* (B), similar to the solution of the third embodiment, after the UE accesses the LTE network, the UE or THE MME may also be selected to initiate setup/modification of a dedicated VoIP bearer between the eNB and the SGW and between the SGW and the PGW, which is not repeatedly described here.

It may be seen from the foregoing that, according to this embodiment, it may be implemented that the UE may be handed over from the CS domain to the PS domain, and after completion of the CS to PS handover, the UE or the MME triggers setup of a dedicated VoIP bearer which corresponds to the UE and is between the SGW and the MGW or between the SGW and the PGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Further, after completion of the handover, the UE may further perform an IMS domain transfer, which may simplify a bearing manner of VoIP data while maintaining voice continuity during the inter-domain handover of the UE.

Embodiment 7

The following describes another embodiment of a method for a handover from a circuit switched domain to a packet switched domain according to an embodiment of the present invention from the perspective of a target mobility management entity (for example, an MME or an SGSN). The method may include: receiving, by a target mobility management entity, a CS to PS handover request message which corresponds to a first user equipment UE and is from a mobile switching center MSC, where the CS to PS handover request message carries a GTP-U tunnel (the GTP-U tunnel is identified by an IP address and a TEID) prepared by an MGW for a dedicated VoIP bearer of the first UE; sending a handover request message to a target access network, where the handover request message carries the GTP-U tunnel prepared by the MGW for the dedicated VoIP bearer of the first UE, to instruct the target access network to prepare a handover resource for the first UE, and trigger setup of a dedicated VoIP bearer which corresponds to the first UE and is between the target access network and the MGW; and sending a CS to PS handover response message corresponding to the first UE to the MSC, where the CS to PS handover response message carries the handover resource prepared by the target access network for the first UE and the GTP-U tunnel prepared by the target access network for the dedicated VoIP bearer of the first UE, so that the first UE uses the foregoing dedicated VoIP bearer to bear a VoIP session between the first UE and the MGW after the first UE is handed over to the target access network.

Figure 7:
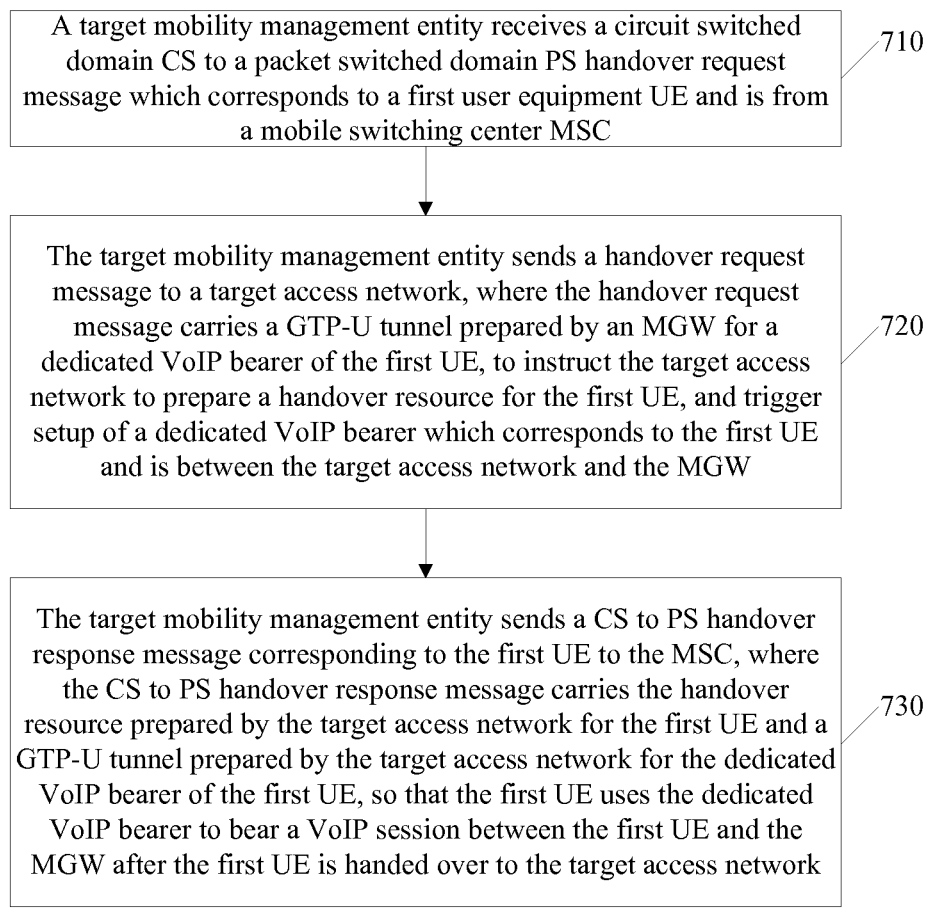
FIG. 7 is a schematic flowchart of another CS to PS handover method according to a seventh embodiment of the present invention.

Referring to FIG. 7, a specific procedure may include:

710: A target mobility management entity receives a circuit switched domain CS to packet switched domain PS handover request message which corresponds to a first user equipment UE and is from a mobile switching center MSC.

In an application scenario, in this embodiment, the mobility management entity triggers setup of a general packet radio service tunnelling protocol (GTP, GPRS (General Packet Radio Service) Tunnelling Protocol) tunnel between an eNB and an MGW, and uses the tunnel as a dedicated VoIP bearer of a first UE. The GTP-U tunnel is identified by an IP address and a TEID (F-TEID).

The CS to PS handover request message of the first UE may carry address information of the MGW, and the IP address and TEID of the GTP-U tunnel prepared by the MGW for the dedicated VoIP bearer of the first UE, and certainly may further carry other related information.

720: The target mobility management entity sends a handover request message to a target access network, where the handover request message carries the GTP-U tunnel prepared by the MGW for the dedicated VoIP bearer of the first UE, to instruct the target access network to prepare a handover resource for the first UE, and trigger setup of a dedicated VoIP bearer which corresponds to the first UE and is between the target access network and the MGW.

In an application scenario, the target mobility management entity sends a handover request message to a target access network, where the message may carry the IP address and TEID of the GTP-U of the MGW, and triggers setup of a dedicated VoIP bearer which corresponds to the first UE and is between the target access network and the MGW; the target access network stores the IP address and TEID of the GTP-U of the MGW, and provides IP addresses and TEIDs.

730: The target mobility management entity sends a CS to PS handover response message corresponding to the first UE to the MSC, where the CS to PS handover response message carries the handover resource prepared by the target access network for the first UE and a GTP-U tunnel prepared by the target access network for the dedicated VoIP bearer of the first UE, so that the first UE uses the dedicated VoIP bearer to bear a VoIP session between the first UE and the MGW after the first UE is handed over to the target access network.

The CS to PS handover response message may further carry the IP address and TEID of the GTP-U of the target access network. The MSC may further notify the MGW of the IP address and TEID (F-TEID) of the GTP-U of the target access network, and the MGW stores the IP address and TEID of the GTP-U of the target access network. In this case, the dedicated VoIP bearer which corresponds to the first UE and is between the MGW and the eNB is set up completely. A voice service of the first UE in a CS network may be mapped to a VoIP session of a target network, and the dedicated VoIP bearer which corresponds to the first UE and is between the eNB and the MGW is used to bear the VoIP session between the first UE and the MGW, while a transmission path of VoIP session data is: first UE<—>eNB<—>MGW.

After accessing the target access network (for example, an eNB), the first UE may configure a VoIP session parameter of the dedicated VoIP bearer, and then use the dedicated VoIP bearer to receive and send VoIP session data packets.

Further, if a call of the UE-1 in a source network (2G/3G) is a video call, the MME may further trigger setup of a dedicated video bearer which corresponds to the first UE and is between the eNB and the MGW when triggering setup of a dedicated VoIP bearer which corresponds to the first UE and is between the eNB and the MGW, where the dedicated video bearer is used to bear the video session between the first UE and the MGW after the first UE accesses the target access network. A manner for setting up a dedicated video bearer is similar to the manner for setting up a dedicated VoIP bearer.

Certainly, only the voice part in the video call of the first UE in the source network may be mapped to the target network. In this case, only the dedicated VoIP bearer may be set up, while the dedicated video bearer may not be set up.

It may be seen from the foregoing that, according to this embodiment, it may be implemented that the UE is handed over from the CS domain to the PS domain, and in a CS to PS handover process, the target mobility management entity triggers setup between the eNB and the MGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Embodiment 8

For ease of understanding, the following further describes the solution of the embodiment of the present invention in detail by taking a process of handing over a UE-1 from a 2G/3G network to an LTE network as an example.

In this embodiment, in the CS to PS handover process of the UE-1, the MME triggers setup of a dedicated VoIP bearer between the UE-1, an eNB, and an MGW, and the MGW forwards uplink and downlink VoIP data packets of the UE-1.

Figure 8A:
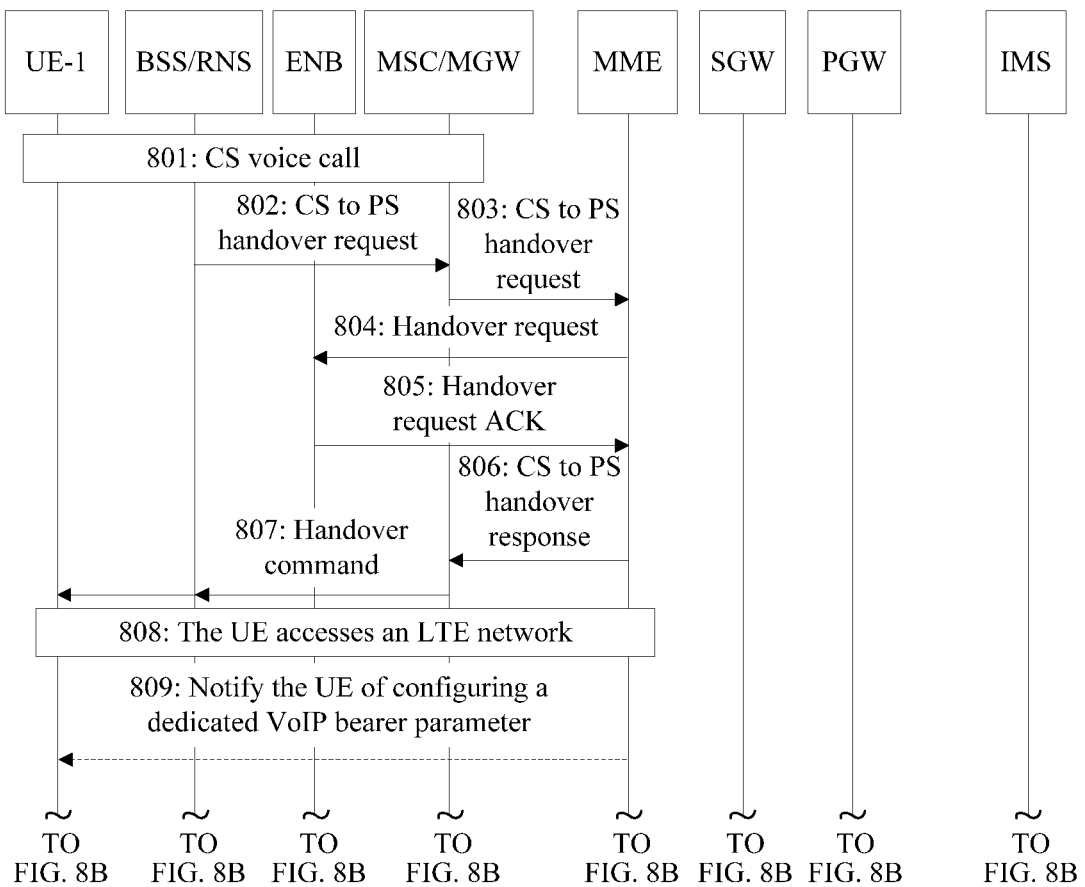
FIG. 8A and FIG. 8B are a schematic flowchart of another CS to PS handover method according to an eighth embodiment of the present invention.
Figure 8B:
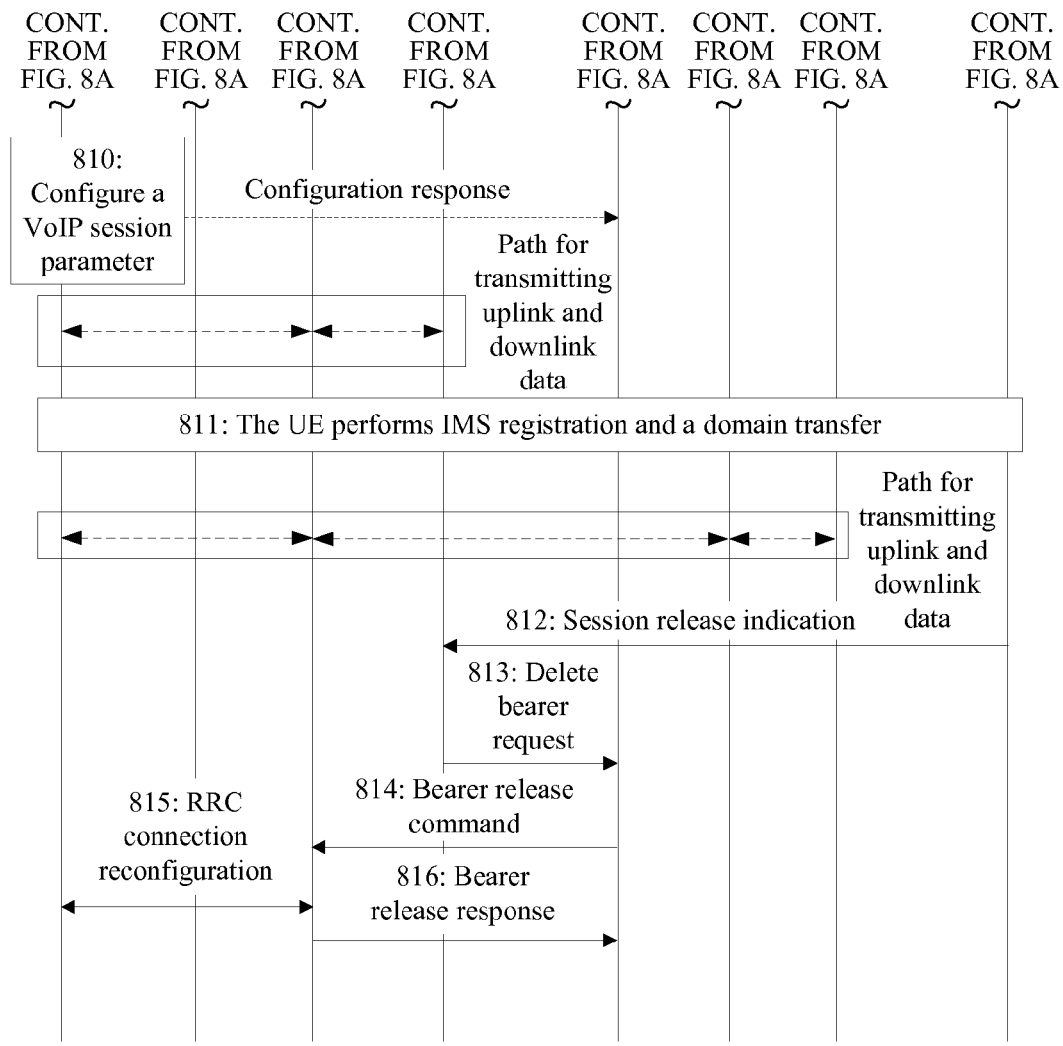

Referring to FIG. 8A and FIG. 8B, a specific process may include:

801: A UE-1 makes a CS voice call.

802: An RNS/BSS initiates a handover procedure, and sends a CS to PS handover request message corresponding to the UE-1 to a visited MSC.

The visited MSC is an MSC close to a target network (LTE network), and the visited MSC and a serving MSC of the UE-1 may be a same MSC, and may also be different MSCs. The visited MSC supports reverse single radio voice call continuity (SRVCC, Single Radio Voice Call Continuity). If the visited MSC is not a current serving MSC (serving MSC) of the UE-1, the visited MSC may actively initiate a CS to PS handover of the UE-1 according to different policies; or, the serving MSC of the UE may also initiate a CS to PS handover corresponding to the UE-1.

If the serving MSC of the UE-1 performs a CS to PS handover, the serving MSC needs to support reverse SRVCC. In actual applications, if the visited MSC is not the current serving MSC C of the UE-1, the CS to PS handover procedure which corresponds to the UE-1 and is initiated by the serving MSC of the UE-1 may include: sending, by the visited MSC, a MAP_SUB_HANDOVER message to the serving MSC of the UE-1; and further initiating, by the serving MSC of the UE-1, a CS to PS handover procedure to an MME. This embodiment mainly takes a CS to PS handover which corresponds to the UE-1 and is initiated by the visited MSC (hereinafter referred to as an MSC) as an example for illustration. It is understandable that if the visited MSC directly initiates a CS to PS handover to the MME, upgrade of the serving MSC may be avoided, and only an MSC adjacent to the LTE network needs to be upgraded, which helps to save the cost.

803: The MSC sends a CS to PS handover request message corresponding to the UE-1 to the MME.

In an application scenario, the CS to PS handover request message which corresponds to the UE-1 and is sent by the MSC to the MME may carry one or multiple pieces of the following information: CKCS and IKCS of the CS domain, KSIMSC, address and port of an MGW, CodeC used by the UE in the PS, and IP address and TEID information of a GTP-U tunnel prepared by the MGW for a dedicated VoIP bearer.

The CodeC used by the UE-1 in the PS may be a common CodeC selected from the CodeC supported by the UE-1 in the PS domain and the CodeC supported by the MGW, while the CodeC may be reported to the MGW in the Attach procedure, Setup procedure, or LAU procedure of the UE-1.

804: The MME receives the CS to PS handover request which is of the UE-1 and sent by the MSC, initiates a handover request procedure to an eNB, sends a handover request message corresponding to the UE-1 to the eNB, to instruct the eNB to prepare a handover resource for the UE-1, and trigger setup of a dedicated VoIP bearer between the eNB and the MGW.

The CS to PS handover request carries the address of the MGW, an IP address and a TEID of the GTP-U tunnel prepared by the MGW for the dedicated VoIP bearer, and other information.

Further, if the MME also receives keys of the CS domain and PS domain, the MME may generate a NONCE parameter, select the CS key as a root key for deriving an LTE key to derive the LTE key, and further notify the UE of using the CS key to derive the LTE key, for example, use the KSIMSC in the handover command to instruct the UE to use the CS key to derive the LTE key.

Further, after receiving the CS to PS handover request message which is of the UE-1 and from the MSC, the MME may first initiate a location update procedure to an HSS, judge whether the UE-1 has subscription information in an LTE network, and if yes, trigger setup of the dedicated VoIP bearer between the eNB and the MGW; if no, terminate the handover procedure.

805: The eNB receives the handover request message which is of the UE-1 and from the MME, further stores information such as the address of the MGW and the TEID of the GTP-U of the MGW, and feeds back a handover request ACK message to the MME, where the message may carry information such as information about a handover resource prepared by the eNB for the UE-1, an address of the UE-1, and the IP address and TEID of the GTP-U tunnel prepared by the eNB for the dedicated VoIP bearer.

806: The MME sends a CS to PS handover response message corresponding to the UE-1 to the MSC, where the message may carry the information such as the information about a handover resource prepared by the eNB for the UE-1 and the IP address and TEID of the GTP-U tunnel prepared by the eNB for the dedicated VoIP bearer.

The MSC notifies the MGW of the information such as the IP address and TEID of the GTP-U tunnel prepared by the eNB for the dedicated VoIP bearer; the MGW further stores the IP address and TEID of the GTP-U tunnel prepared by the eNB for the dedicated VoIP bearer and so on. Till now, the dedicated VoIP bearer which corresponds to the UE-1 and is from the eNB to the MGW is set up completely.

It is understandable that steps 801 to 806 describe an execution phase of the CS to PS handover of the UE-1. The following describes an execution phase of the CS to PS handover of the UE-1.

807: The MSC receives the CS to PS handover response message which is of the UE-1 and from the MME, and sends a CS to PS handover command to the UE-1 through an RNC, instructing the UE-1 to access the eNB.

In an application scenario, the RNC sends a handover command to the UE-1, where the command carries information about a handover resource prepared by the eNB for the UE-1.

808: The UE-1 receives the handover command, and accesses the eNB; the UE-1 may further send a handover complete message to the eNB; the eNB receives the handover complete message from the UE-1, and may further send a handover complete message to the MME, notifying the MME that the handover of the UE-1 is complete.

809: The LTE network and the UE may synchronize a configuration parameter in multiple manners.

One manner may be: The MME delivers one or multiple of the following parameters to the UE-1: IP address of the UE-1, special APN, TFT, bearer identifier, encoding/decoding format, packetization interval, RTP payload type, MGW address, port, and so on.

In an application scenario, the MME may send a non-access stratum (NAS, Non-Access Statun) message to the UE-1 after the UE-1 accesses the LTE network, where the NAS message carries the foregoing VoIP session parameter to notify the UE-1 of the foregoing VoIP session parameter, and the UE-1 acquires the VoIP session parameter by receiving and parsing the NAS message, and performs configuration. Alternatively, the MME may also carry the foregoing VoIP session parameter in a handover request sent to the eNB; the eNB encapsulates the VoIP session parameter into a container and sends the container to the RNS/BSS; the RNS/BSS may carry the VoIP session parameter in a handover command to notify the UE-1; and the UE-1 implements synchronization of the VoIP session parameter with the LTE network accordingly.

A second manner may be: The UE-1 and the MGW separately use a default VoIP session parameter to configure the dedicated VoIP bearer. For example, the UE-1 fixedly uses a certain private address and port to bear a VOIP flow, while the MGW fixedly uses another private address and port to bear a VOIP flow, and the UE-1 generates a TFT according to the addresses and ports. The RTP payload type may also be set according to a default value, and the encoding/decoding format may adopt an AMR (adaptive multirate voice format), and the packetization interval and other parameters also adopt default values.

810: If the UE-1 receives the VoIP session parameter delivered by the MME, the UE-1 creates configuration parameters such as APN, IP address, port, and TFT locally, and may further return a response to the MME.

After configuration of the VoIP session parameter is complete, the UE may receive and send VOIP data flows.

In addition, if the MME does not deliver the VoIP session parameter to the UE-1, the UE-1 may use a default parameter to locally configure a dedicated VoIP bearer.

Further, if the UE-1 is not attached to an EPC, the MME may send a location update request message to an HSS to initiate location update, and obtain related subscription data of the UE-1 from the HSS, or, the UE-1 may execute an attach (attach) procedure to complete obtaining of the related subscription data.

In this case, a transmission path of VoIP uplink data of the UE-1 is UE-1→eNB→MGW; a transmission path of VoIP downlink data of the UE-1 is MGW→eNB→UE-1.

Further, if a call of the UE-1 in a source network (2G/3G) is a video call, the MME may further trigger setup of a dedicated video bearer which corresponds to the UE-1 and is between the eNB and the MGW, where the dedicated video bearer is used to bear a video session between the UE-1 and the MGW after the UE-1 accesses a target access network. A manner for setting up a dedicated video bearer is similar to the manner for setting up a dedicated VoIP bearer.

Certainly, only the voice part in the video call of the UE-1 in the source network may be mapped to the target network. In this case, only the dedicated VoIP bearer may be set up, while the dedicated video bearer may not be set up.

811: If the UE-1 has not been registered with an IMS, the UE-1 initiates IMS registration, and initiates an IMS domain transfer procedure.

812: After completion of an IMS domain transfer process, the IMS may instruct the MSC/MGW to release a corresponding session of the UE-1.

After completion of a domain transfer, the UE-1 sets up a new bearer in the LTE network.

A transmission path of the VoIP uplink data of the UE-1 is: UE-1→eNB→SGW→PGW.

A transmission path of the VoIP downlink data of the UE-1 is: PGW→SGW→eNB→UE-1.

813: The MSC/MGW sends a delete bearer request to the MME, initiates bearer release, and triggers release of the dedicated VOIP bearer which corresponds to the UE-1, is between the eNB and the MGW and is set up before the domain transfer.

814: The MME sends a bearer release command to the eNB, instructing the eNB to delete the dedicated VoIP bearer which corresponds to the UE-1, is between the MGW and the eNB and is set up before the domain transfer.

815: The eNB receives the bearer release command from the MME, deletes the corresponding bearer set up before the domain transfer of the UE-1, and performs RRC connection reconfiguration with the UE-1.

816: The eNB sends a bearer release response to the MME.

It may be seen from the foregoing that, according to this embodiment, it may be implemented that the UE is handed over from the CS domain to the PS domain, and in a CS to PS handover process, the MME triggers setup between the eNB and the MGW; therefore, after the UE is handed over to the target network, a voice service of the UE in the CS domain may be mapped to the VoIP session of the target network quickly; and using the set up dedicated VoIP bearer to bear a VoIP data flow of the UE helps to maintain voice continuity during an inter-domain handover of the UE.

Further, after completion of the handover, the UE may further perform an IMS domain transfer, which may simplify a bearing manner of VoIP data while maintaining voice continuity during the inter-domain handover of the UE.

To better implement the technical solutions of the embodiments of the present invention, an embodiment of the present invention further provides a corresponding apparatus and communications system.

Figure 9:
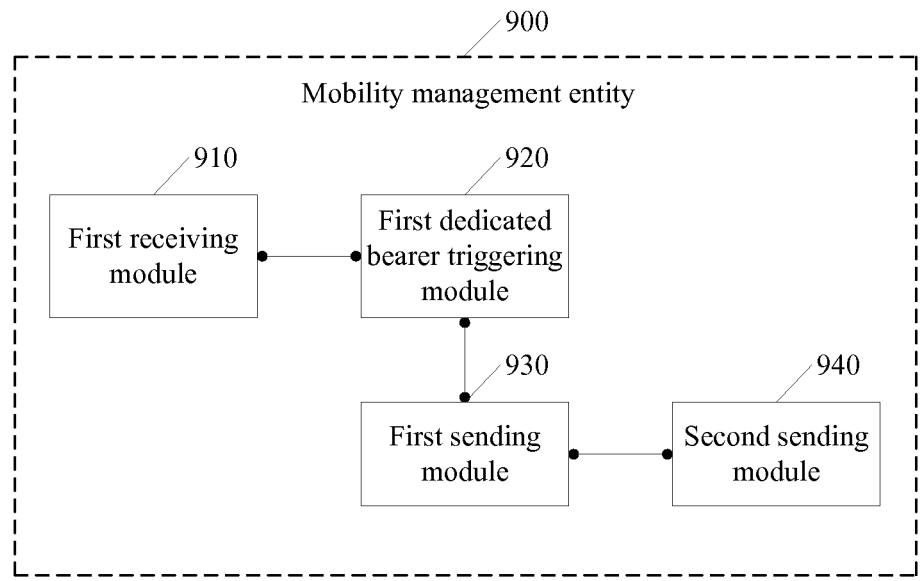
FIG. 9 is a schematic diagram of a mobility management entity according to an embodiment of the present invention.

Referring to FIG. 9, a mobility management entity 900 according to an embodiment of the present invention may include a first receiving module 910, a first dedicated bearer triggering module 920, a first sending module 930, and a second sending module 940.

The first receiving module 910 is configured to receive a CS to PS handover request message which corresponds to a first UE and is from an MSC.

The first dedicated bearer triggering module 920 is configured to trigger setup of a dedicated voice over Internet protocol VoIP bearer which corresponds to the first UE and is between a serving gateway SGW and a media gateway MGW, or, trigger setup of a dedicated VoIP bearer which corresponds to the first UE and is between the SGW and a packet data network gateway PGW.

The first sending module 930 is configured to send a handover request message to a target access network to instruct the target access network to prepare a handover resource for the first UE.

The second sending module 940 is configured to send a CS to PS handover response message corresponding to the first UE to the MSC, where the CS to PS handover response message carries the handover resource prepared by the target access network for the first UE, so that the first UE uses the dedicated VoIP bearer to bear a VoIP session between the first UE and the MGW after the first UE is handed over to the target access network.

In an application scenario, the CS to packet switched domain PS handover request message received by the first receiving module 910 carries address information of the MGW.

The mobility management entity 900 may further include a first default bearer triggering module that is configured to send a create session message carrying the address information of the MGW to the SGW, and trigger sending of a create session message to the MGW by the SGW, to set up a default bearer which corresponds to the first UE and is between the SGW and the MGW. Alternatively, a second default bearer triggering module can be configured to send a create session message to the SGW, and trigger sending of a create session message to the PGW by the SGW, to set up a default bearer which corresponds to the first UE and is between the SGW and the PGW.

The first dedicated bearer triggering module 920 may include a first dedicated bearer triggering submodule that is configured to trigger sending of a create bearer message to the SGW by the MGW after the default bearer which corresponds to the first UE and is between the SGW and the MGW is set up, to set up a dedicated VoIP bearer which corresponds to the first UE and is between the SGW and the MGW.

Alternatively, a second dedicated bearer triggering submodule can be configured to send a bearer resource command message to the SGW after the default bearer which corresponds to the first UE and is between the SGW and the MGW is set up, and to trigger sending of a bearer resource command message to the MGW by the SGW, to set up a dedicated VoIP bearer which corresponds to the first UE and is between the SGW and the MGW. In another embodiment a third dedicated bearer triggering submodule can be configured to send a request bearer resource command message to the SGW after the default bearer which corresponds to the first UE and is between the SGW and the PGW is set up, and trigger sending of a bearer resource command message to the PGW by the SGW, to set up a dedicated VoIP bearer which corresponds to the first UE and is between the SGW and the PGW.

In an application scenario, the mobility management entity 700 may further include a delivering module that is configured to deliver a VoIP session parameter to the first UE.

In an application scenario, the delivering module may include a first delivering submodule that is configured to deliver a VoIP session parameter to the first UE through non-access stratum signaling or a second delivering submodule that is configured to deliver a VoIP session parameter to the target access network, so that the target access network encapsulates the VoIP session parameter into a transparent container to return to a source access network (for example, an RNC), and that the source access network delivers the VoIP session parameter to the first UE through a handover command.

In an application scenario, if a PS network is a long term evolution LTE network, the mobility management entity 700 may further include a key deriving module that is configured to obtain a CS key and use the CS key to derive a long term evolution LTE network key and a key delivering module that is configured to notify the first UE of the LTE network key or to notify the first UE of a parameter for deriving the LTE network key. The parameter may be a CS key.

It is understandable that a function of each functional module of the mobility management entity 900 in this embodiment may be specifically implemented according to the method in the foregoing corresponding method embodiments. For its specific implementation manner, reference may be made to the related description in the foregoing method embodiments, and details are not repeatedly described here.

Figure 10:
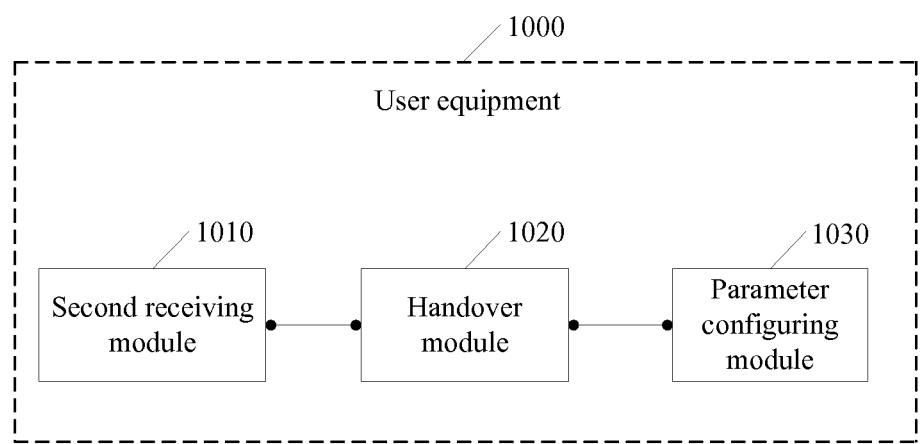
FIG. 10 is a schematic diagram of a user equipment according to an embodiment of the present invention.

Referring to FIG. 10, a user equipment 100 in an embodiment of the present invention may include a second receiving module 1010 that is configured to receive a handover command delivered by a source access network, where the handover command carries information about a handover resource prepared by a target access network for the user equipment UE. A handover module 1020 is configured to access the target access network. A parameter configuring module 1030 is configured to configure a VoIP session parameter of a dedicated VoIP bearer, so that the dedicated VoIP bearer is used to bear a VoIP session between the UE and an MGW.

In an application scenario, the parameter configuring module 1030 may specifically be configured to use a VoIP session configuration parameter delivered by an MME to perform parameter configuration; or use a local default VoIP session parameter to perform parameter configuration.

It is understandable that a function of each functional module of the user equipment 1000 in this embodiment may be specifically implemented according to the method in the foregoing corresponding method embodiments. For its specific implementation manner, reference may be made to the related description in the foregoing method embodiments, and details are not repeatedly described here.

Figure 11:
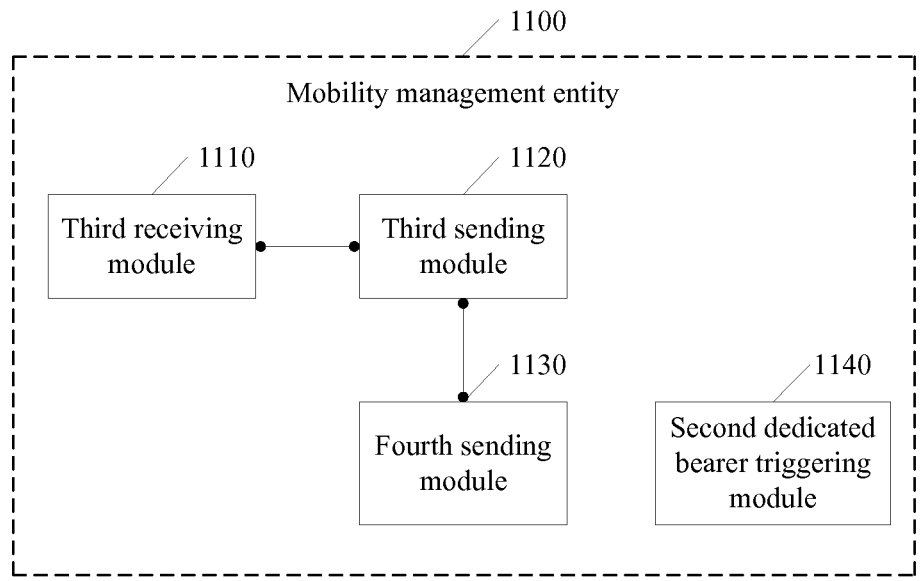
FIG. 11 is a schematic diagram of another mobility management entity according to an embodiment of the present invention.

Referring to FIG. 11, a mobility management entity 1100 in an embodiment of the present invention may include a third receiving module 1110 that is configured to receive a CS to PS handover request message which corresponds to a first UE and is from an MSC and a PS handover request message which corresponds to the first UE and is from an SGSN. A third sending module 1120 is configured to send a handover request message to a target access network to instruct the target access network to prepare, for the first UE, a handover resource corresponding to the PS handover request message from the SGSN. A fourth sending module 1130 is configured to send a CS to PS handover response message corresponding to the first UE to the MSC, and send a PS handover response message corresponding to the first UE to the SGSN, so that the MSC and/or the SGSN instructs the UE to access the target access network.

A second dedicated bearer triggering module 1140 is configured to: after a handover of the first UE is complete, trigger setup of a dedicated voice over Internet protocol VoIP bearer which corresponds to the first UE and is between an SGW and an MGW, or, trigger setup of a dedicated VoIP bearer which corresponds to the first UE and is between the SGW and a PGW, so that the first UE uses the dedicated VoIP bearer to bear a VoIP session between the first UE and the MGW after the first UE is handed over to the target access network.

It is understandable that a function of each functional module of the mobility management entity 1100 in this embodiment may be specifically implemented according to the method in the foregoing corresponding method embodiments. For its specific implementation manner, reference may be made to the related description in the foregoing method embodiments, and details are not repeatedly described here.

Figure 12:
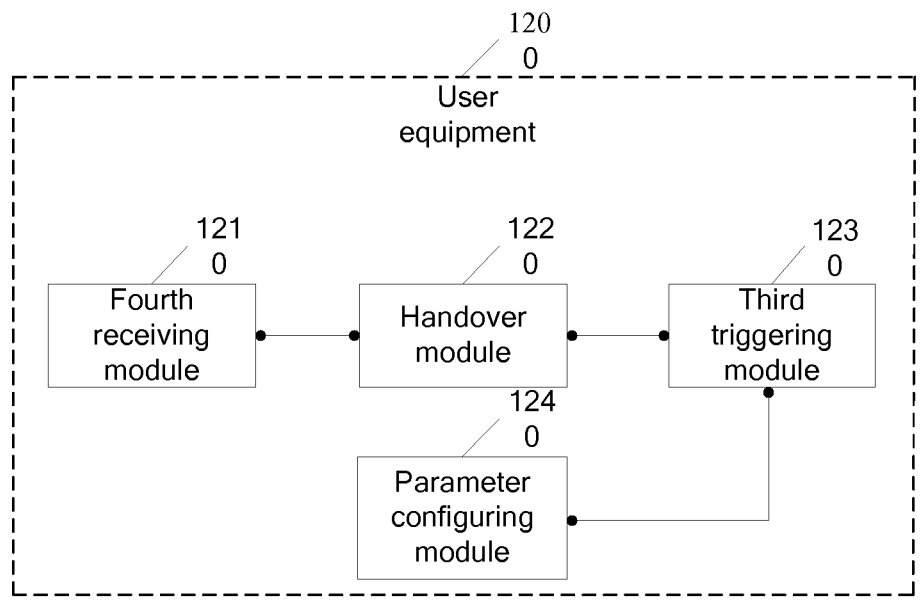
FIG. 12 is a schematic diagram of another user equipment according to an embodiment of the present invention.

Referring to FIG. 12, a user equipment 1200 in an embodiment of the present invention includes a fourth receiving module 1210 that is configured to receive a handover command delivered by a source access network, where the handover command carries information about a handover resource prepared by a target access network for the user equipment UE. A handover module 1220 is configured to access the target access network. A third triggering module 1230 is configured to: after a handover of the user equipment UE 1200 is complete, trigger setup of a dedicated voice over Internet protocol VoIP bearer which corresponds to the UE and is between a serving gateway SGW and a media gateway MGW, or trigger setup of a dedicated VoIP bearer which corresponds to the UE and is between the SGW and a PGW. A parameter configuring module 1240 is configured to configure a VoIP session parameter of the dedicated VoIP bearer, so that the dedicated VoIP bearer is used to bear a VoIP session between the UE and the MGW.

It is understandable that a function of each functional module of the user equipment 1200 in this embodiment may be specifically implemented according to the method in the foregoing corresponding method embodiments. For its specific implementation manner, reference may be made to the related description in the foregoing method embodiments, and details are not repeatedly described here.

Figure 13:
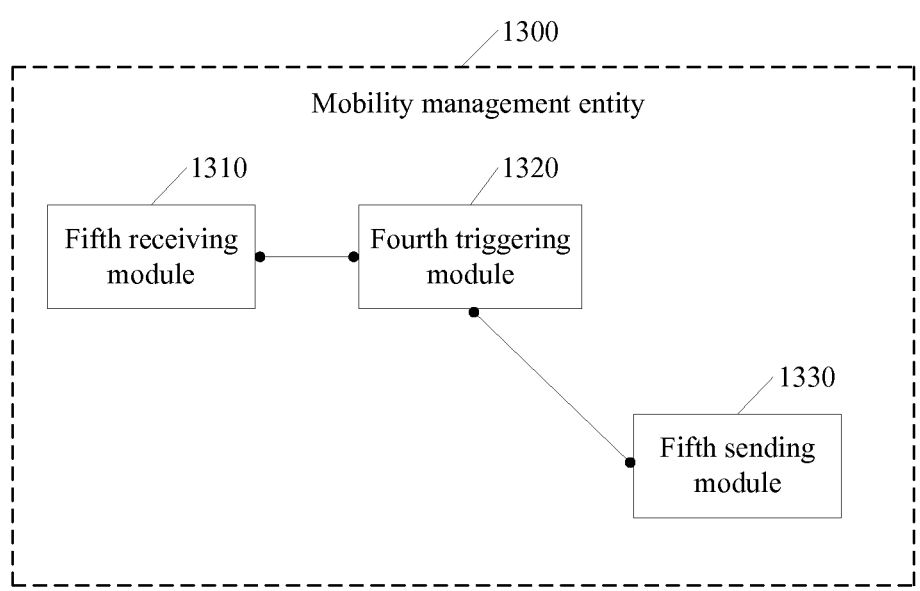
FIG. 13 is a schematic diagram of another mobility management entity according to an embodiment of the present invention.

Referring to FIG. 13, a mobility management entity 1300 in an embodiment of the present invention includes a fifth receiving module 1310 that is configured to receive a CS to PS handover request message which corresponds to a first UE and is from an MSC, where the CS to PS handover request message carries a GTP-U tunnel prepared by an MGW for a dedicated VoIP bearer of the first UE. A fourth triggering module 1320 is configured to send a handover request message to a target access network. The handover request message carries the GTP-U tunnel prepared by the MGW for the dedicated VoIP bearer of the first UE, to instruct the target access network to prepare a handover resource for the first UE, and trigger setup of a dedicated VoIP bearer which corresponds to the first UE and is between the target access network and the MGW.

A fifth sending module 1330 is configured to send a CS to PS handover response message corresponding to the first UE to the MSC, where the CS to PS handover response message carries the handover resource prepared by the target access network for the first UE and a GTP-U tunnel prepared by the target access network for the dedicated VoIP bearer of the first UE, so that the first UE uses the dedicated VoIP bearer to bear a VoIP session between the first UE and the MGW after the first UE is handed over to the target access network.

It is understood that a function of each functional module of the mobility management entity 1300 in this embodiment may be specifically implemented according to the method in the foregoing corresponding method embodiments. For its specific implementation manner, reference may be made to the related description in the foregoing method embodiments, and details are not repeatedly described here.

An embodiment of the present invention also provides a communications system, including a mobility management entity 900, a user equipment 1000, a mobility management entity 1100, a user equipment 1200, or a mobility management entity 1300.

Persons of ordinary skill in the art should understand that part of the steps of the method according to the foregoing embodiments may be implemented by a program instructing relevant hardware. The program may be stored in a computer readable storage medium, and the storage medium may include a read only memory, a random access memory, a magnetic disk, an optical disk, and so on.

The foregoing describes the method for a handover from a circuit switched domain to a packet switched domain, the device, and the communications system provided by the embodiments of the present invention in detail. The principles and the implementation manners of the present invention are described with reference to specific examples, and the description of the foregoing embodiments is only intended to help understand the method and its core idea of the present invention. Meanwhile, persons of ordinary skill in the art may make variations to the specific implementation manners and the application scopes according to the idea of the present invention. Therefore, the content of the specification shall not be construed as a limitation to the present invention.

What is claimed is:

1. A method for a handover from a circuit switched domain to a packet switched domain, the method comprising:
   receiving, by a target mobility management entity, a circuit switched domain (CS) to packet switched domain (PS) handover request message that corresponds to a user equipment (UE) and is from a mobile switching center (MSC);
   triggering, by the target mobility management entity and according to the CS to PS handover request message, setup of a dedicated voice over Internet protocol (VoIP) bearer that corresponds to the UE, wherein the dedicated VoIP bearer is established either between a serving gateway (SGW) and a media gateway (MGW) or between the SGW and a packet data network gateway (PGW);
   sending, by the target mobility management entity, a handover request message to a target access network to instruct the target access network to prepare a handover resource for the UE;
   sending, from the target mobility management entity to the MSC, a CS to PS handover response message corresponding to the UE, wherein the CS to PS handover response message carries the handover resource prepared by the target access network for the UE, so that the UE is handed over to the target access network using the handover resource, wherein the dedicated VoIP bearer is used to bear a VoIP session between the UE and the MGW after the UE is handed over to the target access network, and wherein the CS to PS handover request message further carries address information of the MGW; and
   sending, by the target mobility management entity, a create session message carrying the address information of the MGW to the SGW, wherein the create session message triggers establishment of a default bearer corresponding to the UE between the SGW and the MGW.

2. The method according to claim 1, wherein the dedicated VoIP bearer is established between the SGW and the MGW.

3. The method according to claim 1, wherein the dedicated VoIP bearer is established between the SGW and the PGW.

4. The method according to claim 1, wherein triggering setup of the dedicated VoIP bearer comprises:
   after the default bearer is established, triggering, by the target mobility management entity and according to the CS to PS handover request message, sending of a create bearer message to the SGW by the MGW, to set up the dedicated VoIP bearer between the SGW and the MGW.

5. The method according to claim 1, wherein triggering setup of the dedicated VoIP bearer comprises:
   after the default bearer is established, sending, by the target mobility management entity and according to the CS to PS handover request message, a bearer resource command message to the SGW, wherein the bearer resource command message is sent to the MGW by the SGW, and wherein the bearer resource command message triggers establishment of the dedicated VoIP bearer between the SGW and the MGW.

6. The method according to claim 1, wherein the method further comprises sending, by the target mobility management entity, a create session message to the SGW, wherein the create session message is sent to the PGW by the SGW, and wherein the create session message triggers establishment of the default bearer between the SGW and the PGW.

7. The method according to claim 6, wherein wherein triggering setup of the dedicated VoIP bearer comprises:
   after the default bearer is established, sending, by the target mobility management entity and according to the CS to PS handover request message, a request bearer resource command message to the SGW, wherein the request bearer resource command message triggers bearer resource command message to be sent to the PGW by the SGW to establish the dedicated VoIP bearer between the SGW and the PGW.

8. The method according to claim 1, further comprising, when triggering setup of the dedicated VoIP bearer between the SGW and the MGW, triggering, by the target mobility management entity, setup of a dedicated video bearer which corresponds to the UE between the SGW and the MGW.

9. The method according to claim 1, wherein the method further comprises delivering, by the target mobility management entity, a VoIP session parameter to the UE through non-access stratum signaling.

10. The method according to claim 1, wherein the PS is part of a long term evolution (LTE) network, and wherein the method further comprises:
    obtaining, by the target mobility management entity, a CS key;
    using the CS key to derive an LTE network key; and
    notifying, by the target mobility management entity, the UE of the LTE network key.

11. The method according to claim 1, further comprising, after the UE is handed over to the target access network, using, by the UE, a VoIP session parameter delivered by the target mobility management entity.

12. The method according to claim 1, further comprising, after the UE is handed over to the target access network, initiating, by the UE, an Internet protocol multimedia subsystem (IMS) session domain transfer to transfer the VoIP session to an IMS domain.

13. The method according to claim 1, further comprising when triggering setup of the dedicated VoIP bearer between the SGW and the PGW, triggering setup of a dedicated video bearer corresponding to the UE between the SGW and the PGW, wherein the dedicated video bearer is used to bear a video session between the UE and the MGW.

14. The method according to claim 1, wherein the PS is part of a long term evolution (LTE) network, and wherein the method further comprises:
    obtaining, by the target mobility management entity, a CS key;
    using the CS key to derive an LTE network key; and
    notifying the UE of the CS key to derive the LTE network key.

15. The method according to claim 1, further comprising, after the UE is handed over to the target access network, using a default VoIP session parameter of the UE to configure a VoIP session parameter of the dedicated VoIP bearer, so that the dedicated VoIP bearer is used to bear the VoIP session between the UE and the MGW.

16. A method for a handover from a circuit switched domain to a packet switched domain, the method comprising:
receiving, by a target mobility management entity, a circuit switched domain (CS) to packet switched domain (PS) handover request message that corresponds to a user equipment (UE) and is from a mobile switching center (MSC);
triggering, by the target mobility management entity and according to the CS to PS handover request message, setup of a dedicated voice over Internet protocol (VoIP) bearer that corresponds to the UE, wherein the dedicated VoIP bearer is established either between a serving gateway (SGW) and a media gateway (MGW) or between the SGW and a packet data network gateway (PGW);
sending, by the target mobility management entity, a handover request message to a target access network to instruct the target access network to prepare a handover resource for the UE;
sending, from the target mobility management entity to the MSC, a CS to PS handover response message corresponding to the UE, wherein the CS to PS handover response message carries the handover resource prepared by the target access network for the UE, so that the UE is handed over to the target access network using the handover resource, wherein the dedicated VoIP bearer is used to bear a VoIP session between the UE and the MGW after the UE is handed over to the target access network; and
delivering, by the target mobility management entity, a VoIP session parameter to the target access network, so that the target access network encapsulates the VoIP session parameter into a transparent container to return to a source access network and that the source access network delivers the VoIP session parameter to the UE through a handover command.

17. A mobility management entity, comprising:
a processor; and
a non-transitory computer readable storage medium storing programming for execution by the processor, the programming including instructions to:
receive a circuit switched domain (CS) to packet switched domain (PS) handover request message that corresponds to a user equipment (UE) and is from a mobile switching center (MCS);
trigger, according to the CS to PS handover request message, setup of a dedicated voice over Internet protocol (VoIP) bearer that corresponds to the UE, wherein the dedicated VoIP bearer is established either between a serving gateway (SGW) and a media gateway (MGW) or between the SGW and a packet data network gateway (PGW);
send a handover request message to a target access network to instruct the target access network to prepare a handover resource for the UE;
send a CS to PS handover response message corresponding to the UE to the MSC, wherein the CS to PS handover response message carries the handover resource prepared by the target access network for the UE, so that the UE is handed over to the target access network using the handover resource, wherein the dedicated VoIP bearer is used to bear a VoIP session between the UE and the MGW after the UE is handed over to the target access network, and wherein the CS to PS handover request message further carries address information of the MGW; and
send a create session message carrying the address information of the MGW to the SGW to trigger establishment of a default bearer, corresponding to the UE, between the SGW and the MGW.

18. The mobility management entity according to claim 17, wherein the instructions to trigger setup of the dedicated VoIP bearer include instructions to trigger sending of a create bearer message to the SGW by the MGW after the default bearer is established between the SGW and the MGW, wherein the create bearer message is adapted to establish the dedicated VoIP bearer between the SGW and the MGW.

19. The mobility management entity according to claim 17, wherein the instructions to trigger setup of the dedicated VoIP bearer include instructions to:
send a bearer resource command message to the SGW after the default bearer is established between the SGW and the MGW, wherein the bearer resource command message is sent to the MGW by the SGW, and wherein the bearer resource command message is adapted to establish the dedicated VoIP bearer between the SGW and the MGW.

20. A mobility management entity, comprising:
a processor; and
a non-transitory computer readable storage medium storing programming for execution by the processor, the programming including instructions to:
receive a circuit switched domain (CS) to packet switched domain (PS) handover request message that corresponds to a user equipment (UE) and is from a mobile switching center (MSC);
trigger, according to the CS to PS handover request message, setup of a dedicated voice over Internet protocol (VoIP) bearer that corresponds to the UE, wherein the dedicated VoIP bearer is established either between a serving gateway (SGW) and a media gateway (MGW) or between the SGW and a packet data network gateway (PGW);
send a handover request message to a target access network to instruct the target access network to prepare a handover resource for the UE;
send a CS to PS handover response message corresponding to the UE to the MSC, wherein the CS to PS handover response message carries the handover resource prepared by the target access network for the UE, so that the UE is handed over to the target access network using the handover resource, wherein the dedicated VoIP bearer is used to bear a VoIP session between the UE and the MGW after the UE is handed over to the target access network;
send a create session message to the SGW, wherein the create session message is sent to the PGW by the SGW, and wherein the create session message is adapted to establish a default bearer that corresponds to the UE between the SGW and the PGW; and
send a request bearer resource command message to the SGW after the default bearer is established between the SGW and the MGW, wherein the request bearer resource command message is sent to the PGW by the SGW, and wherein the request bearer resource command message is adapted to establish a dedicated VoIP bearer that corresponds to the UE between the SGW and the PGW.

* * * * *

UNITED STATES PATENT AND TRADEMARK OFFICE
CERTIFICATE OF CORRECTION

PATENT NO. : 9,078,173 B2  
APPLICATION NO. : 13/664302  
DATED : July 7, 2015  
INVENTOR(S) : Hai Liu Page 1 of 1

It is certified that error appears in the above-identified patent and that said Letters Patent is hereby corrected as shown below:

In The Claims

In Col. 36, line 21, claim 7, delete "triggers bearer" and insert --triggers a bearer--.
In Col. 37, line 47, claim 17, delete "(MCS);" and insert --(MSC);--.

Signed and Sealed this
Seventeenth Day of November, 2015

Michelle K. Lee
*Director of the United States Patent and Trademark Office*